US012423587B2

(12) United States Patent
Kauffmann et al.

(10) Patent No.: US 12,423,587 B2
(45) Date of Patent: Sep. 23, 2025

(54) SYSTEMS, METHODS, AND GRAPHICAL USER INTERFACES FOR MITIGATING BIAS IN A MACHINE LEARNING-BASED DECISIONING MODEL

(71) Applicant: SAS INSTITUTE INC., Cary, NC (US)

(72) Inventors: Luiz Henrique Outi Kauffmann, Apex, NC (US); Aline Riquetti Campos Emídio, Brasília (BR)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/765,014

(22) Filed: Jul. 5, 2024

(65) Prior Publication Data
US 2025/0117664 A1 Apr. 10, 2025

Related U.S. Application Data

(63) Continuation of application No. 18/764,967, filed on Jul. 5, 2024, now Pat. No. 12,321,847.

(60) Provisional application No. 63/623,049, filed on Jan. 19, 2024, provisional application No. 63/543,003, filed on Oct. 6, 2023.

(51) Int. Cl.
| | | |
|---|---|---|
| *G06N 3/0895* | (2023.01) | |
| *G06F 17/16* | (2006.01) | |
| *G06N 3/042* | (2023.01) | |
| *G06N 3/0475* | (2023.01) | |
| *G06N 3/08* | (2023.01) | |
| *G06N 5/045* | (2023.01) | |

(52) U.S. Cl.
CPC .......... *G06N 3/0895* (2023.01); *G06F 17/16* (2013.01); *G06N 3/042* (2023.01); *G06N 3/0475* (2023.01); *G06N 3/08* (2013.01); *G06N 5/045* (2013.01)

(58) Field of Classification Search
CPC ............................ G06N 3/0895; G06N 3/042
See application file for complete search history.

(56) References Cited

U.S. PATENT DOCUMENTS

2018/0336457 A1* 11/2018 Pal .................. G06N 3/045
2021/0049503 A1    2/2021 Nourian
(Continued)

OTHER PUBLICATIONS

Minh et al., "Explainable Artificial Intelligence: A Comprehensive Review," 2021.

*Primary Examiner* — Li B. Zhen
*Assistant Examiner* — Henry Nguyen
(74) *Attorney, Agent, or Firm* — Padowithz Alce; Quintin Scheitlin; Alce PLLC

(57) ABSTRACT

A system, method, and computer-program product includes obtaining a decisioning dataset comprising a plurality of favorable decisioning records and at least one unfavorable decisioning record; detecting, via a machine learning algorithm, a favorable decisioning record of the plurality of favorable decisioning records that has a vector value closest to a vector value of the unfavorable decisioning record; executing a counterfactual assessment between the favorable decisioning record and the unfavorable decisioning record; generating an explainability artifact based on one or more bias intensity metrics to explain a bias in a machine learning-based decisioning model; and in response to generating the explainability artifact, displaying the explainability artifact in a user interface.

30 Claims, 27 Drawing Sheets

(56) References Cited

U.S. PATENT DOCUMENTS

| | | | |
|---|---|---|---|
| 2021/0174258 A1 | 6/2021 | Wenchel | |
| 2022/0147622 A1* | 5/2022 | Chesla | G06F 21/552 |
| 2022/0309334 A1* | 9/2022 | Rossi | G06N 3/08 |
| 2023/0076559 A1 | 3/2023 | Sankarapu | |
| 2023/0080553 A1* | 3/2023 | Dharmasiri | G10L 15/063 |
| | | | 704/231 |
| 2023/0154561 A1* | 5/2023 | Cheng | G06N 3/084 |
| | | | 702/19 |
| 2023/0222778 A1* | 7/2023 | Acharya | G06V 10/7747 |
| | | | 382/155 |
| 2023/0246852 A1* | 8/2023 | Lupowitz | H04L 9/50 |
| | | | 713/162 |
| 2023/0334332 A1* | 10/2023 | Wu | G06V 10/761 |
| 2024/0062051 A1* | 2/2024 | Baran Pouyan | G06N 20/20 |

* cited by examiner

| ID 1516A | Feature A 1516B | Feature B 1516C | Feature C 1516D | Feature D 1516E | Feature E 1516F | Feature F 1516G | Decision 1516N |
|---|---|---|---|---|---|---|---|
| $ID_1$ | Value $A_1$ | Value $B_1$ | Value $C_1$ | Value $D_1$ | Value $E_1$ | Value $F_1$ | Favorable |
| $ID_2$ | Value $A_2$ | Value $B_2$ | Value $C_2$ | Value $D_2$ | Value $E_2$ | Value $F_2$ | Favorable |
| $ID_3$ | Value $A_3$ | Value $B_3$ | Value $C_3$ | Value $D_3$ | Value $E_3$ | Value $F_3$ | Favorable |
| $ID_4$ | Value $A_4$ | Value $B_4$ | Value $C_4$ | Value $D_4$ | Value $E_4$ | Value $F_4$ | Favorable |
| $ID_5$ | Value $A_5$ | Value $B_5$ | Value $C_5$ | Value $D_5$ | Value $E_5$ | Value $F_5$ | Favorable |
| $ID_6$ | Value $A_6$ | Value $B_6$ | Value $C_6$ | Value $D_6$ | Value $E_6$ | Value $F_6$ | Unfavorable |
| $ID_7$ | Value $A_7$ | Value $B_7$ | Value $C_7$ | Value $D_7$ | Value $E_7$ | Value $F_7$ | Unfavorable |
| $ID_8$ | Value $A_8$ | Value $B_8$ | Value $C_8$ | Value $D_8$ | Value $E_8$ | Value $F_8$ | Unfavorable |
| $ID_9$ | Value $A_9$ | Value $B_9$ | Value $C_9$ | Value $D_9$ | Value $E_9$ | Value $F_9$ | Unfavorable |
| $ID_{10}$ | Value $A_{10}$ | Value $B_{10}$ | Value $C_{10}$ | Value $D_{10}$ | Value $E_{10}$ | Value $F_{10}$ | Unfavorable |

FIG. 15B

| Identity (ID) Feature | Distance-to-Node Relevancy Feature A | Distance-to-Node Relevancy Feature B | Distance-to-Node Relevancy Feature C | ... | Distance-to-Node Relevancy Feature D | Model Output Feature |
|---|---|---|---|---|---|---|
| $ID_1$ | Value $A_1$ | Value $B_1$ | Value $C_1$ | ... | Value $D_1$ | $Label_1$ |
| $ID_2$ | Value $A_2$ | Value $B_2$ | Value $C_2$ | ... | Value $D_2$ | $Label_2$ |
| $ID_3$ | Value $A_3$ | Value $B_3$ | Value $C_3$ | ... | Value $D_3$ | $Label_3$ |
| ... | ... | ... | ... | ... | ... | ... |
| $ID_N$ | Value $A_N$ | Value $B_N$ | Value $C_N$ | ... | Value $D_N$ | $Label_N$ |

FIG. 17D

| Technique | Area Under Curve (ROC) |
|---|---|
| Traditional RNC with First Level | 0.6156 |
| Traditional RNC with All Levels | 0.6252 |
| ERNC without Community | 0.6301 |
| ERNC with Community | 0.6312 |
| ERNC with Community and Logistic Regression | 0.7084 |
| ERNC with Community and Decision Tree | 0.719 |

FIG. 17G

SYSTEMS, METHODS, AND GRAPHICAL USER INTERFACES FOR MITIGATING BIAS IN A MACHINE LEARNING-BASED DECISIONING MODEL

CROSS-REFERENCE TO RELATED APPLICATIONS

This application is a continuation of U.S. patent application Ser. No. 18/764,967, filed on 5 Jul. 2024, which claims the benefit of U.S. Provisional Application No. 63/623,049, filed on 19 Jan. 2024, and U.S. Provisional Application No. 63/543,003, filed on 6 Oct. 2023, which are incorporated in their entireties by this reference.

TECHNICAL FIELD

This invention relates generally to the machine learning field and, more specifically, to new and useful systems and methods for mitigating bias in machine learning-based decisioning models.

BACKGROUND

Due to rapid advancements in data science and machine learning, decisioning models are increasingly being used across various industries. A decision produced by a decisioning model is often difficult to understand due to the complexity and opacity of these models. This issue, commonly referred to as the "black box" problem, arises because the internal workings of these models are not transparent, making it challenging to discern how specific inputs are processed to yield particular outputs.

While using decisioning models can significantly improve the efficiency of a decision-making process, the "black box" nature of these models often undermines user trust and introduces challenges in ensuring fairness in the decisioning-making process.

Accordingly, there is a need for new and improved systems and methods that enhance the fairness, accuracy, and transparency of decisioning models. The embodiments of the present application provide technical solutions that at least address the needs described above, as well as the deficiencies of the state of the art.

BRIEF SUMMARY OF THE INVENTION(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In some embodiments, a computer-program product comprising a non-transitory machine-readable storage medium storing computer instructions that, when executed by one or more processors, perform operations comprising: obtaining a decisioning dataset from a machine learning-based decisioning model, wherein the decisioning dataset includes a plurality of favorable decisioning records and at least one unfavorable decisioning record; detecting, via a machine learning algorithm, a favorable decisioning record of the plurality of favorable decisioning records that has a vector value closest to a vector value of the unfavorable decisioning record; executing a counterfactual assessment between the favorable decisioning record and the unfavorable decisioning record, wherein the counterfactual assessment includes: retrieving attributes of the favorable decisioning record and the unfavorable decisioning record, and computing one or more bias intensity metrics based on disparities between the attributes of the favorable decisioning record and the unfavorable decisioning record; generating an explainability artifact that uses the one or more bias intensity metrics to explain a bias in the machine learning-based decisioning model; and in response to generating the explainability artifact, displaying the explainability artifact in a user interface.

In some embodiments, a first bias intensity metric of the one or more bias intensity metrics represents a difference between a respective attribute of the favorable decisioning record and the unfavorable decisioning record, the explainability artifact explains the bias in the machine learning-based decisioning model by indicating factors causing the bias in the machine learning-based decisioning model, and indicating the factors causing the bias in the machine learning-based decisioning model includes: determining that a value of the first bias intensity metric is less than a threshold amount, and based on determining that the value of the first bias intensity metric is less than the threshold amount, displaying, in the explainability artifact, the first bias intensity metric with visual emphasis indicating the respective attribute associated with the first bias intensity metric is a factor contributing to the bias in the machine learning-based decisioning model.

In some embodiments, a second bias intensity metric of the one or more bias intensity metrics represents a difference between a second respective attribute of the favorable decisioning record and the unfavorable decisioning record, and indicating the factors causing the bias in the machine learning-based decisioning model further includes: determining that a value of the second bias intensity metric is more than the threshold amount, and based on determining that the value of the second bias intensity metric is more than the threshold amount, displaying, in the explainability artifact, the second bias intensity metric with visual emphasis indicating the second respective attribute associated with the second bias intensity metric is not a factor contributing to the bias in the machine learning-based decisioning model.

In some embodiments, the one or more bias intensity metrics includes a first bias intensity metric that represents a difference between a respective attribute of the favorable decisioning record and the unfavorable decisioning record, and using the one or more bias intensity metrics to explain the bias in the machine learning-based decisioning model includes: displaying, in the explainability artifact, a value of the first bias intensity metric, and indicating, via visual emphasis displayed in association with the value of the first bias intensity metric, an unfairness of the machine learning-based decisioning model when the value of the first bias intensity metric indicates that the difference between the respective attribute of the favorable decisioning record and the unfavorable decisioning record is less than a threshold amount.

In some embodiments, using the one or more bias intensity metrics to explain the bias in the machine learning-based decisioning model further includes: indicating, via the visual emphasis displayed in association with the value of the first bias intensity metric, a fairness of the machine learning-based decisioning model when the value of the first bias intensity metric indicates that the difference between the respective attribute of the favorable decisioning record and the unfavorable decisioning record is more than the threshold amount.

In some embodiments, the machine learning algorithm is configurable to detect a plurality of favorable decisioning records that have vector values closest to the vector value of the unfavorable decisioning record, and detecting, via the machine learning algorithm, the plurality of favorable decisioning records that have the vector values closest to the vector value of the unfavorable decisioning record at least includes: detecting the favorable decisioning record that has the vector value closest to the vector value of the unfavorable decisioning record, and detecting a second favorable decisioning record of the plurality of favorable decisioning records that has a vector value that is second closest to the vector value of the unfavorable decisioning record.

In some embodiments, the machine learning algorithm computes a plurality of vector distances between the unfavorable decisioning record and the plurality of favorable decisioning records, and detecting, via the machine learning algorithm, the favorable decisioning record that has the vector value closest to the vector value of the unfavorable decisioning record includes: identifying a smallest vector distance among the plurality of vector distances computed by the machine learning algorithm, wherein a vector distance between the unfavorable decisioning record and a first favorable decisioning record of the plurality of favorable decisioning records is identified as having the smallest vector distance, and selecting the first favorable decisioning record as the favorable decisioning record that has the vector value closest to the vector value of the unfavorable decisioning record.

In some embodiments, a respective vector distance of the plurality of vector distances computed by the machine learning algorithm denotes a Euclidean distance between the vector value of the unfavorable decisioning record and a vector value of a respective favorable decisioning record.

In some embodiments, the machine learning algorithm detects the favorable decisioning record and further detects a second favorable decisioning record of the plurality of favorable decisioning records that has a vector value that is second closest to the vector value of the unfavorable decisioning record. In some embodiments, the computer instructions, when executed by the one or more processors, perform operations further comprising: retrieving the attributes of the second favorable decisioning record; and computing one or more second bias intensity metrics based on disparities between the attributes of the unfavorable decisioning record and the attributes of the second favorable decisioning record. In some embodiments, the explainability artifact uses the one or more bias intensity metrics and further uses the one or more second bias intensity metrics to explain the bias in the machine learning-based decisioning model.

In some embodiments, the decisioning dataset includes a plurality unfavorable decisioning records, including the unfavorable decisioning record and one or more other unfavorable decisioning records. In some embodiments, the computer instructions, when executed by the one or more processors, perform operations further comprising: executing a plurality of counterfactual assessments, wherein executing the plurality of counterfactual assessments includes: executing the counterfactual assessment between the favorable decisioning record and the unfavorable decisioning record, and executing one or more additional counterfactual assessments between the one or more other unfavorable decisioning records and one or more of the plurality of favorable decisioning records.

In some embodiments, a respective bias intensity metric of the one or more bias intensity metrics represents a difference between a respective attribute of the unfavorable decisioning record and the favorable decisioning record.

In some embodiments, the decisioning dataset includes one or more attributes, including an account score attribute, and computing the one or more bias intensity metrics includes computing an account score bias intensity metric that represents a difference between the account score attribute of the unfavorable decisioning record and the account score attribute of the favorable decisioning record.

In some embodiments, the decisioning dataset includes one or more attributes, including a resource attribute, and computing the one or more bias intensity metrics includes computing a resource bias intensity metric that represents a difference between the resource attribute of the unfavorable decisioning record and the resource attribute of the favorable decisioning record.

In some embodiments, the user interface is accessible by a user, displaying the explainability artifact enables the user to execute a bias mitigation process, and the bias mitigation process reconfigures one or more components of the machine learning-based decisioning model to mitigate the bias in the machine learning-based decisioning model.

In some embodiments, the machine learning-based decisioning model comprises one or more sub-models, including at least one heuristic-based model comprising a plurality of decisioning heuristics, and reconfiguring the one or more components of the machine learning-based decisioning model to mitigate the bias includes: reconfiguring thresholds of the plurality of decisioning heuristics to mitigate the heuristic-based model from generating unfavorable decisions for decisioning records that have similar attributes to the unfavorable decisioning record.

In some embodiments, the machine learning-based decisioning model comprises one or more sub-models, including at least one machine learning model, and reconfiguring the one or more components of the machine learning-based decisioning model to mitigate the bias includes: updating a weight and a bias of the machine learning model to mitigate the machine learning model from generating unfavorable decisions for decisioning records that have similar attributes to the unfavorable decisioning record.

In some embodiments, the machine learning-based decisioning model comprises one or more sub-models, including at least one machine learning model, and reconfiguring the one or more components of the machine learning-based decisioning model to mitigate the bias includes: reconfiguring an algorithmic structure of the machine learning model to include model constraints that constrain the machine learning model from generating unfavorable decisions for decisioning records that have similar attributes to the unfavorable decisioning record.

In some embodiments, the machine learning-based decisioning model comprises one or more sub-models, including at least one machine learning model, and reconfiguring the one or more components of the machine learning-based decisioning model to mitigate the bias includes: transforming a prediction by the machine learning model from an unfavorable prediction to a favorable prediction when a corresponding decisioning record has similar factors as the factors causing the bias.

In some embodiments, the machine learning algorithm uses a k-nearest neighbor algorithm to detect the favorable decisioning record that has the vector value closest to the vector value of the unfavorable decisioning record.

In some embodiments, the explainability artifact comprises a plurality of data visualization components, including: a first table component that includes a row corresponding to the unfavorable decisioning record and columns corresponding to the attributes of the unfavorable decisioning record, a second table component that includes a row corresponding to the favorable decisioning record that has the vector value closest to the vector value of the unfavorable decisioning record and columns corresponding to the one or more bias intensity metrics, and a graph component that graphs the unfavorable decisioning record and one or more other unfavorable decisioning records in the decisioning dataset to illustrate a distribution of a respective attribute shared by the unfavorable decisioning record and the one or more other unfavorable decisioning records.

In some embodiments, the machine learning algorithm detects the favorable decisioning record and further detects a second favorable decisioning record of the plurality of favorable decisioning records that has a vector value that is second closest to the vector value of the unfavorable decisioning record, and the second table component includes the row corresponding to the favorable decisioning record and further includes a second row corresponding to the second favorable decisioning record that has the vector value that is second closest to the vector value of the unfavorable decisioning record.

In some embodiments, a computer-implemented method comprises: obtaining a decisioning dataset from a machine learning-based decisioning model, wherein the decisioning dataset includes a plurality of favorable decisioning records and at least one unfavorable decisioning record; detecting, via a machine learning algorithm, a favorable decisioning record of the plurality of favorable decisioning records that has a vector value closest to a vector value of the unfavorable decisioning record; executing a counterfactual assessment between the favorable decisioning record and the unfavorable decisioning record, wherein the counterfactual assessment includes: retrieving attributes of the favorable decisioning record and the unfavorable decisioning record, and computing one or more bias intensity metrics based on disparities between the attributes of the favorable decisioning record and the unfavorable decisioning record; generating an explainability artifact that uses the one or more bias intensity metrics to explain a bias in the machine learning-based decisioning model; and in response to generating the explainability artifact, displaying the explainability artifact in a user interface.

In some embodiments, a first bias intensity metric of the one or more bias intensity metrics represents a difference between a respective attribute of the favorable decisioning record and the unfavorable decisioning record, the explainability artifact explains the bias in the machine learning-based decisioning model by indicating factors causing the bias in the machine learning-based decisioning model, and indicating the factors causing the bias in the machine learning-based decisioning model includes: determining that a value of the first bias intensity metric is less than a threshold amount, and based on determining that the value of the first bias intensity metric is less than the threshold amount, displaying, in the explainability artifact, the first bias intensity metric with visual emphasis indicating the respective attribute associated with the first bias intensity metric is a factor contributing to the bias in the machine learning-based decisioning model.

In some embodiments, a second bias intensity metric of the one or more bias intensity metrics represents a difference between a second respective attribute of the favorable decisioning record and the unfavorable decisioning record, and indicating the factors causing the bias in the machine learning-based decisioning model further includes: determining that a value of the second bias intensity metric is more than the threshold amount, and based on determining that the value of the second bias intensity metric is more than the threshold amount, displaying, in the explainability artifact, the second bias intensity metric with visual emphasis indicating the second respective attribute associated with the second bias intensity metric is not a factor contributing to the bias in the machine learning-based decisioning model.

In some embodiments, the one or more bias intensity metrics includes a first bias intensity metric that represents a difference between a respective attribute of the favorable decisioning record and the unfavorable decisioning record, and using the one or more bias intensity metrics to explain the bias in the machine learning-based decisioning model includes: displaying, in the explainability artifact, a value of the first bias intensity metric, and indicating, via visual emphasis displayed in association with the value of the first bias intensity metric, an unfairness of the machine learning-based decisioning model when the value of the first bias intensity metric indicates that the difference between the respective attribute of the favorable decisioning record and the unfavorable decisioning record is less than a threshold amount.

In some embodiments, using the one or more bias intensity metrics to explain the bias in the machine learning-based decisioning model further includes: indicating, via the visual emphasis displayed in association with the value of the first bias intensity metric, a fairness of the machine learning-based decisioning model when the value of the first bias intensity metric indicates that the difference between the respective attribute of the favorable decisioning record and the unfavorable decisioning record is more than the threshold amount.

In some embodiments, a computer-implemented system comprises: one or more processors; a memory; and a computer-readable medium operably coupled to the one or more processors, the computer-readable medium having computer-readable instructions stored thereon that, when executed by the one or more processors, cause a computing device to perform operations comprising: obtaining a decisioning dataset from a machine learning-based decisioning model, wherein the decisioning dataset includes a plurality of favorable decisioning records and at least one unfavorable decisioning record; detecting, via a machine learning algorithm, a favorable decisioning record of the plurality of favorable decisioning records that has a vector value closest to a vector value of the unfavorable decisioning record; executing a counterfactual assessment between the favorable decisioning record and the unfavorable decisioning record, wherein the counterfactual assessment includes: retrieving attributes of the favorable decisioning record and the unfavorable decisioning record, and computing one or more bias intensity metrics based on disparities between the attributes of the favorable decisioning record and the unfavorable decisioning record; generating an explainability artifact that uses the one or more bias intensity metrics to explain a bias in the machine learning-based decisioning model; and in response to generating the explainability artifact, displaying the explainability artifact in a user interface.

In some embodiments, the machine learning algorithm is configurable to detect a plurality of favorable decisioning records that have vector values closest to the vector value of the unfavorable decisioning record, and detecting, via the machine learning algorithm, the plurality of favorable decisioning records that have the vector values closest to the vector value of the unfavorable decisioning record at least includes: detecting the favorable decisioning record that has the vector value closest to the vector value of the unfavorable decisioning record, and detecting a second favorable decisioning record of the plurality of favorable decisioning records that has a vector value that is second closest to the vector value of the unfavorable decisioning record.

In some embodiments, the machine learning algorithm computes a plurality of vector distances between the unfavorable decisioning record and the plurality of favorable decisioning records, and detecting, via the machine learning algorithm, the favorable decisioning record that has the vector value closest to the vector value of the unfavorable decisioning record includes: identifying a smallest vector distance among the plurality of vector distances computed by the machine learning algorithm, wherein a vector distance between the unfavorable decisioning record and a first favorable decisioning record of the plurality of favorable decisioning records is identified as having the smallest vector distance, and selecting the first favorable decisioning record as the favorable decisioning record that has the vector value closest to the vector value of the unfavorable decisioning record.

In some embodiments, a respective vector distance of the plurality of vector distances computed by the machine learning algorithm denotes a Euclidean distance between the vector value of the unfavorable decisioning record and a vector value of a respective favorable decisioning record.

A computer-program product according to some aspects of the present technology may include non-transitory machine-readable storage medium storing computer instructions that, when executed by one or more processors, perform the following operations. Executed instructions may function by obtaining an erroneously labeled dataset comprising a plurality of erroneously labeled data samples, and generating an extended relational neighbor classifier training dataset from the erroneously labeled dataset. Generating the extended relational neighbor classifier training dataset may include the following operations: executing a label correction process that converts the erroneously labeled dataset to an accurately labeled dataset comprising a plurality of accurately labeled data samples, generating a network graph from the plurality of accurately labeled data samples, partitioning, via a community detection algorithm, the network graph into a plurality of node communities, wherein a respective node community of the plurality of node communities includes nodes with different classification labels, and generating the extended relational neighbor classifier training dataset based on the respective node community. A respective row of the extended relational neighbor classifier training dataset may include: an identity feature that specifies an identity (ID) of a corresponding node in the respective node community, a plurality of distance-to-node relevancy features, wherein a respective distance-to-node relevancy feature of the plurality of distance-to-node relevancy features specifies a proportion of nodes having a target label at a respective distance from the corresponding node, and a model output feature that specifies a current label associated with the corresponding node. Executed instructions may function further by training an extended relational neighbor classifier using the extended relational neighbor classifier training dataset, detecting an insertion of an unlabeled node into the respective node community; and assigning, via the extended relational neighbor classifier, a label to the unlabeled node. Executed instructions such as the ones mentioned above may be termed a computer-implemented method, and may be executed using computing resources such as one or more processors and a memory that are operably coupled to the computer- or machine-readable medium on which the instructions are stored.

In some embodiments, the obtained plurality of erroneously labeled data samples may correspond to incorrect predictions made by a machine learning-based decisioning model. In some embodiments, the plurality of distance-to-node relevancy features mentioned above may include: the respective distance-to-node relevancy feature, and one or more additional distance-to-node relevancy features that specifies a proportion of nodes having the target label at one or more other distances from the corresponding node. Further, in some embodiments, a distance between the corresponding node and the nodes with different classification labels may be less than a pre-defined maximum distance, the respective node community further includes nodes exceeding the pre-defined maximum distance from the corresponding node, including a plurality of nodes located at a second respective distance from the corresponding node. The plurality of distance-to-node relevancy features may include the respective distance-to-node relevancy feature, and may not include a second respective distance-to-node relevancy feature that specifies a proportion of the plurality of nodes having the target label at the second respective distance from the corresponding node. In some embodiments, the pre-defined maximum distance is a distance that may include at least a threshold percentage of all node-to-node distances within the respective node community.

In some embodiments, the plurality of node communities may at least include the respective node community and one or more additional node communities, and the community detection algorithm may partition a respective node of the network graph into the respective node community when the community detection algorithm detects that the network graph has a greater number of edge connections between the respective node and nodes of the respective node community than edge connections between the respective node and nodes of the one or more additional node communities. In some embodiments, the one or more additional node communities may include a first additional node community, and the community detection algorithm may further partition the respective node of the network graph into the first additional node community when the community detection algorithm detects that the network graph has a greater number of edge connections between the respective node and nodes of the first additional node community than the edge connections between the respective node and the nodes of the respective node community.

In some embodiments, the plurality of accurately labeled data samples may include a first plurality of accurately labeled data samples that have a common attribute, the network graph may include a first plurality of nodes corresponding to the first plurality of accurately labeled data samples, and the first plurality of nodes may be connected by one more edges to indicate the common attribute. In some embodiments, the aforementioned network graph may include the first plurality of nodes and at least one additional node, the additional node in the network graph may correspond to an additional accurately labeled data sample of the plurality of accurately labeled data samples, the first plurality of accurately labeled data samples have the common attribute and the additional accurately labeled data sample may not have the common attribute, and the network graph may not include edges connecting the additional node to the first plurality of nodes to indicate an absence of the common attribute in the additional accurately labeled data sample.

In some embodiments, the network graph may be homophilic, and the network graph may be homophilic when nodes with similar attributes are connected to each other more frequently than with nodes that do not have similar attributes. The extended relational neighbor classifier may be a tree-based extended relational neighbor classifier. Assigning, via the extended relational neighbor classifier, the label to the unlabeled node may include computing, via the extended relational neighbor classifier, the label for the unlabeled node based on nodes in the respective node community directly connected to the unlabeled node and nodes in the respective node community indirectly connected to the unlabeled node.

In some embodiments, an erroneously labeled data sample of the plurality of erroneously labeled data samples may include one or more predictive features and an erroneous label assigned by a machine learning-based decisioning model, and the plurality of accurately labeled data samples may include an accurately labeled data sample corresponding to the erroneously labeled data sample. The accurately labeled data sample may include the one or more predictive features of the erroneously labeled data sample, and a correct label that resolves the erroneous label in the erroneously labeled data sample. In some embodiments, the erroneously labeled dataset may be a dataset that includes a data sample with an incorrect label, the data sample may have the incorrect label when a current label associated with the data sample differs from a ground truth label associated with the data sample, and the data sample may not have the incorrect label when the current label associated with the data sample matches the ground truth label associated with the data sample.

In some embodiments, the label correction process may convert a respective erroneously labeled data sample to an accurately labeled data sample by receiving user input specifying a ground truth label for the respective erroneously labeled data sample, and based on receiving the user input, converting the respective erroneously labeled data sample to the accurately labeled data sample by replacing an erroneous label currently assigned to the respective erroneously labeled data sample with the ground truth label. In some embodiments, nodes with different classification labels may include one or more nodes with a first classification label and one or more nodes with a second classification label, and the label that the extended relational neighbor classifier assigns to the unlabeled node may be one of: the first classification label and the second classification label.

BRIEF DESCRIPTION OF THE FIGURES

FIG. 15B illustrates an example of a decisioning dataset, according to some embodiments of the present technology.

FIG. 17D illustrates an exemplary training set for a machine-learning model including network graph-derived features of a dataset, according to some embodiments of the present technology.

FIG. 17G illustrates an exemplary comparison of ROC curves for difference modeling techniques implemented at the machine learning model training and testing platform of FIG. 17E, according to some embodiments of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.
Example Systems Systems depicted in some of the figures may be provided in various configurations. In some embodiments, the systems may be configured as a distributed system where one or more components of the system are distributed across one or more networks in a cloud computing system.

Figure 1:
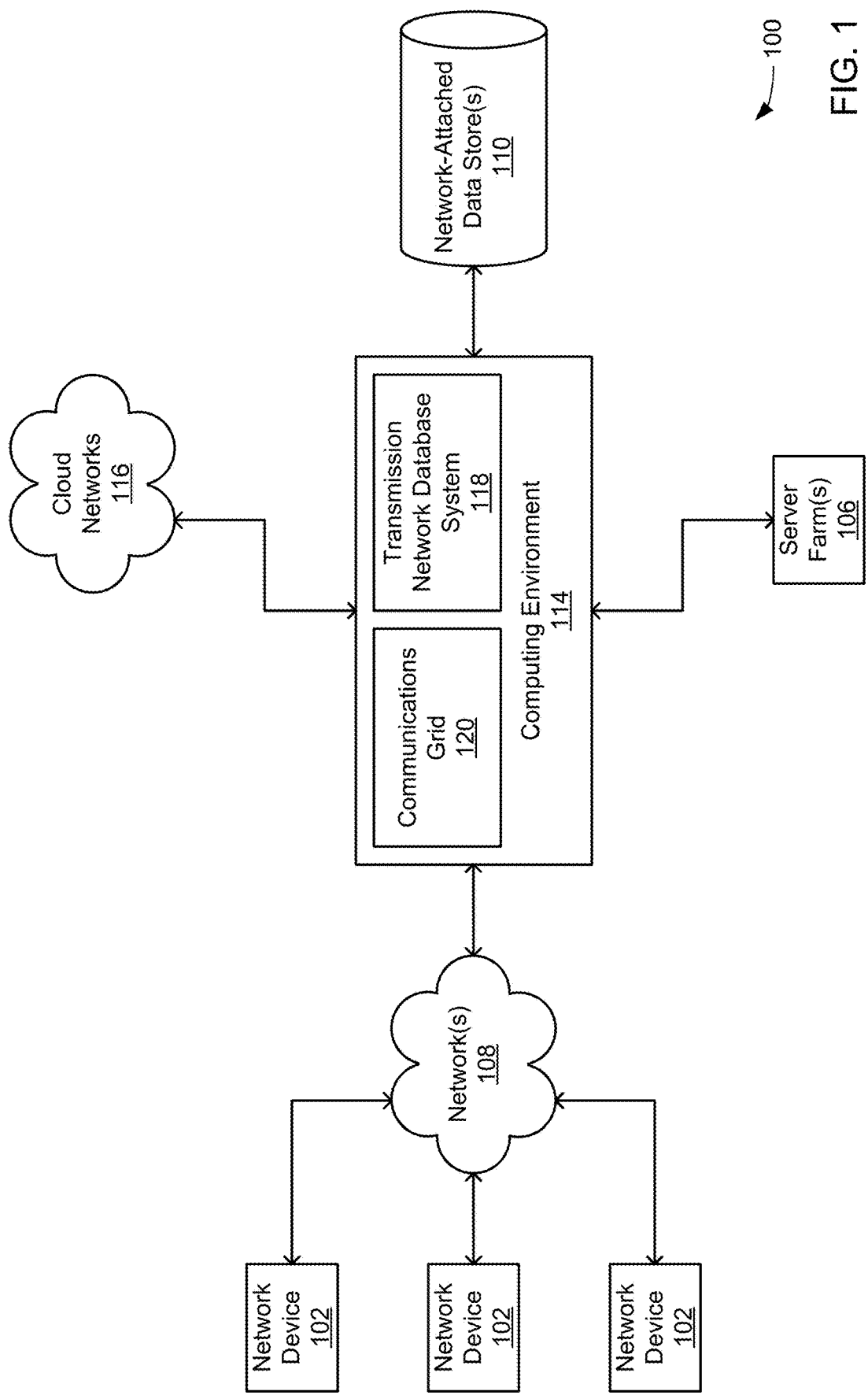
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
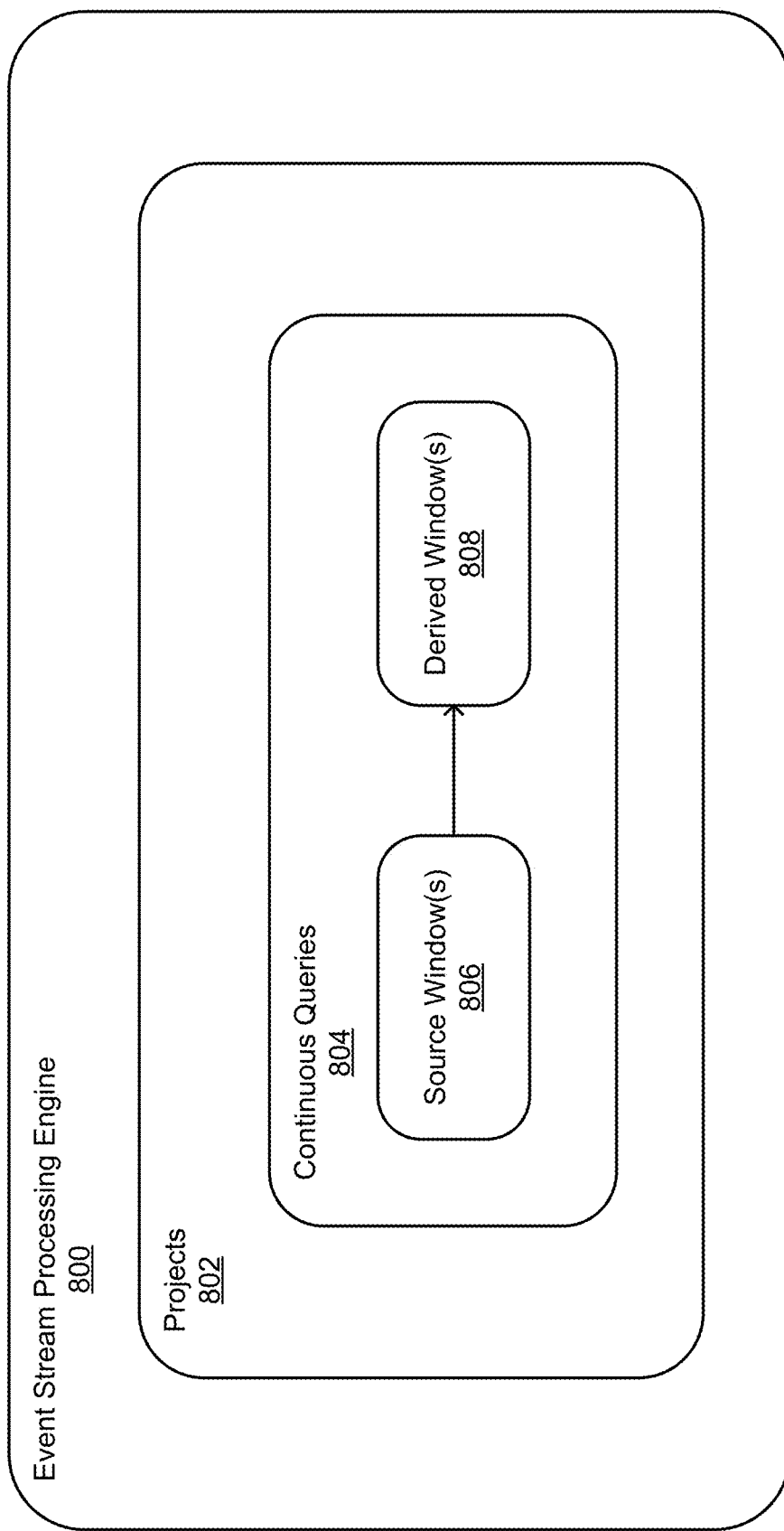
FIG. 8 illustrates a block diagram including components of an Event Stream Processing Engine (ESPE), according to some embodiments of the present technology.
Figure 9:
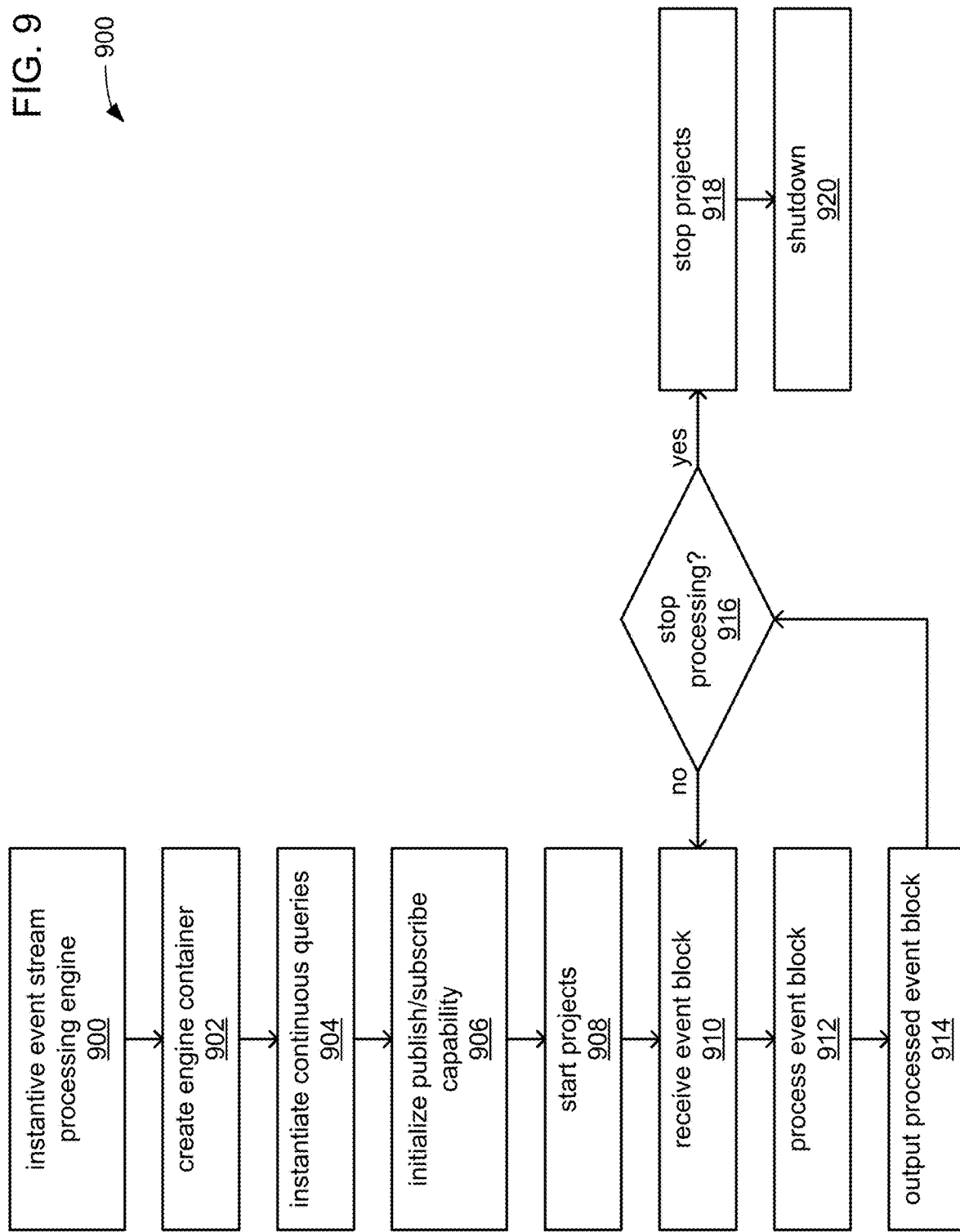
FIG. 9 illustrates a flow chart showing an example process including operations performed by an event stream processing engine, according to some embodiments of the present technology.
Figure 10:
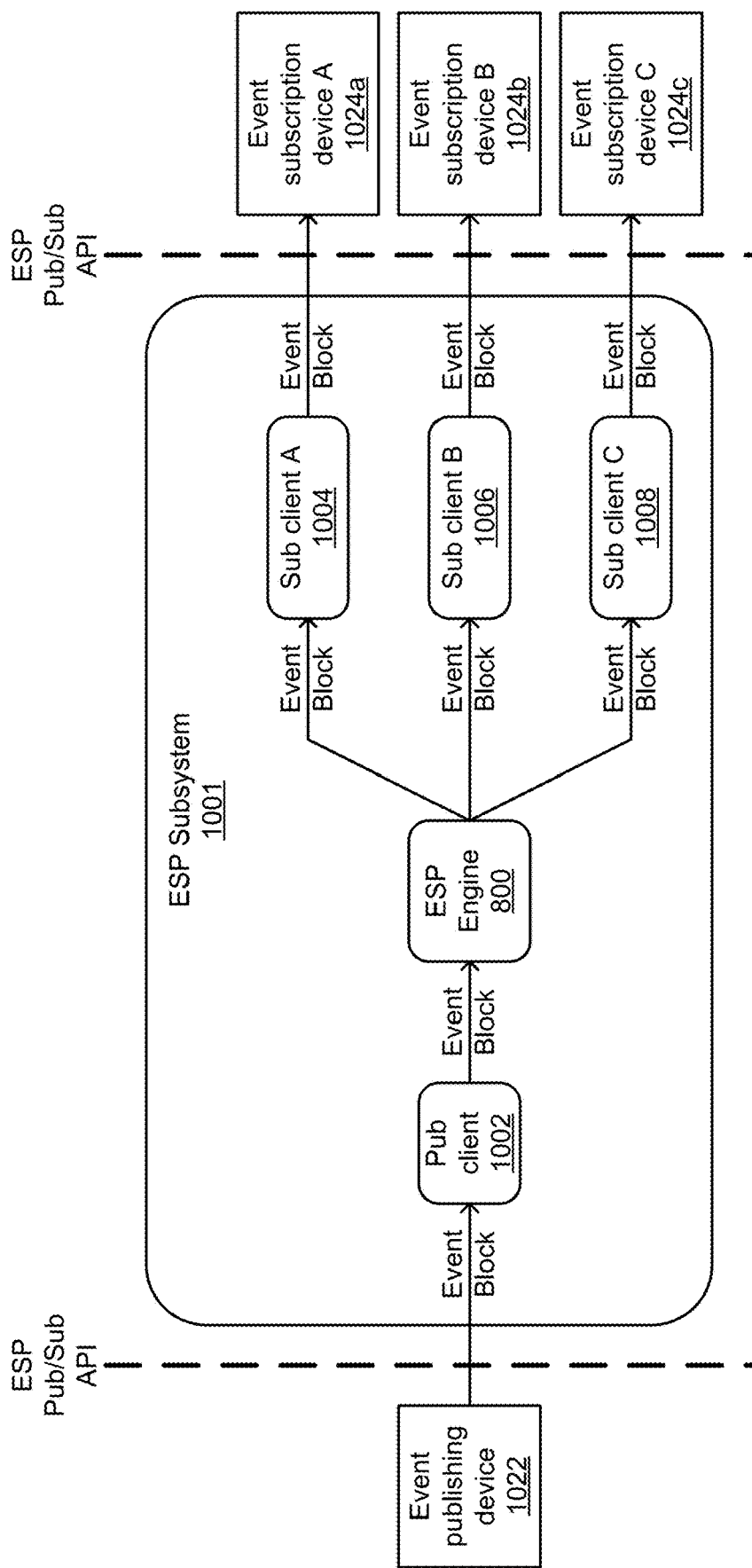
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models)

or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
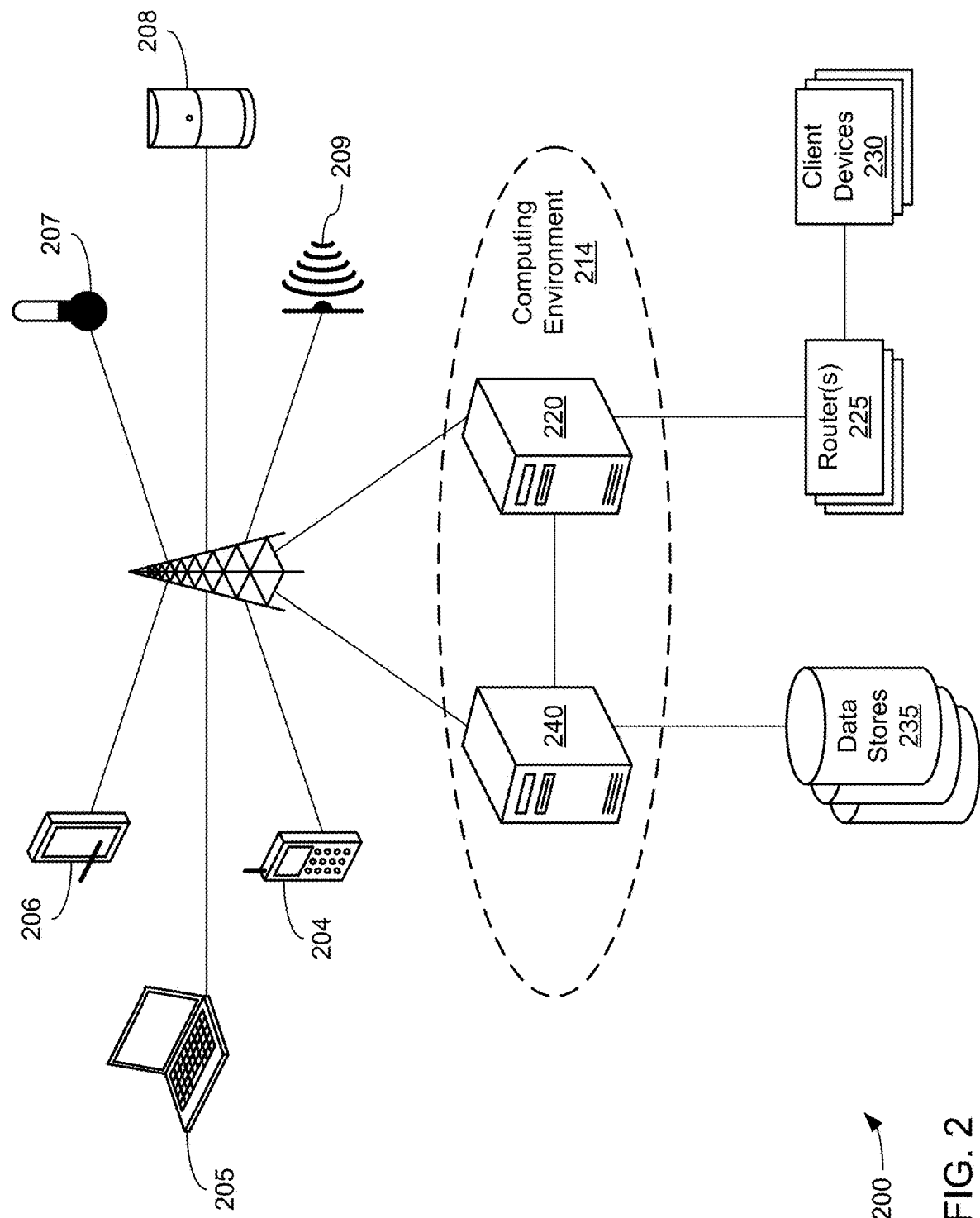
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
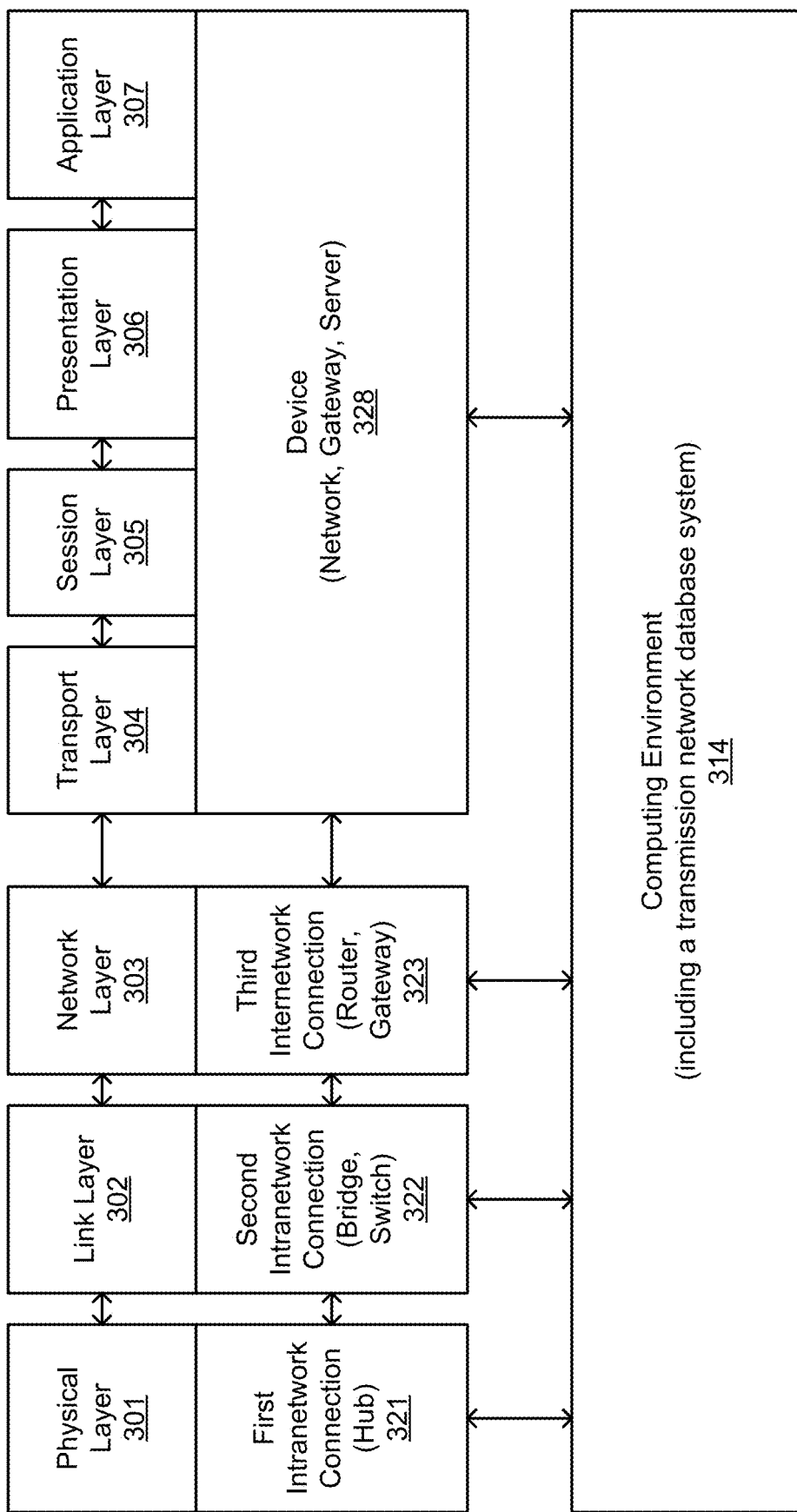
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
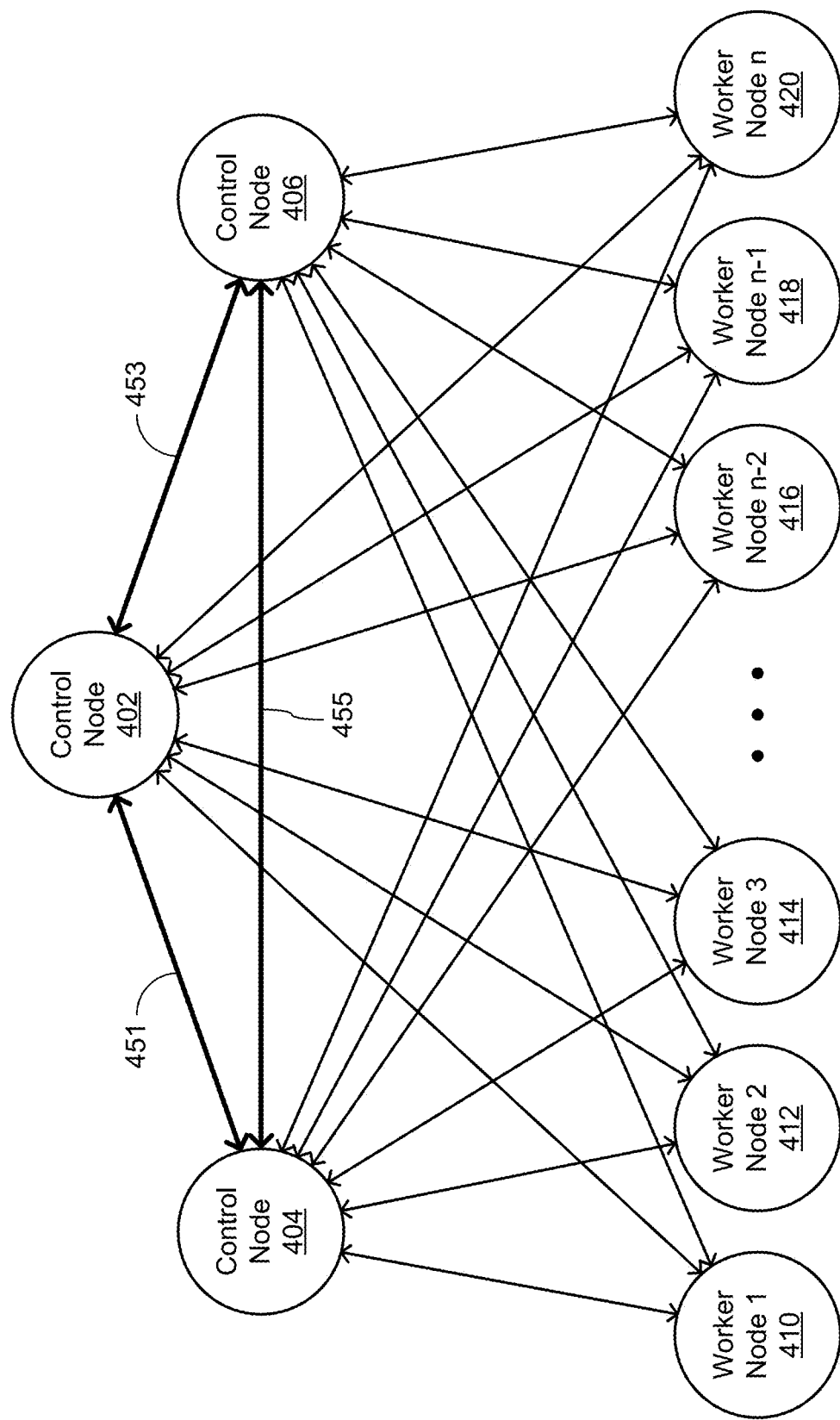
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
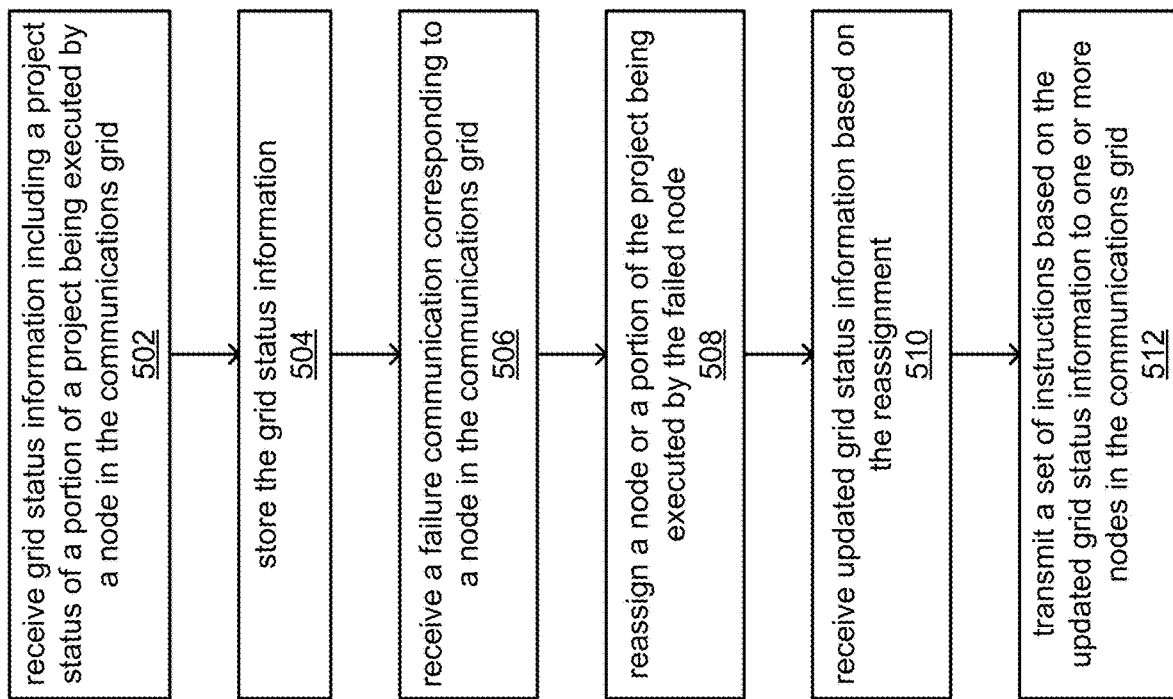
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
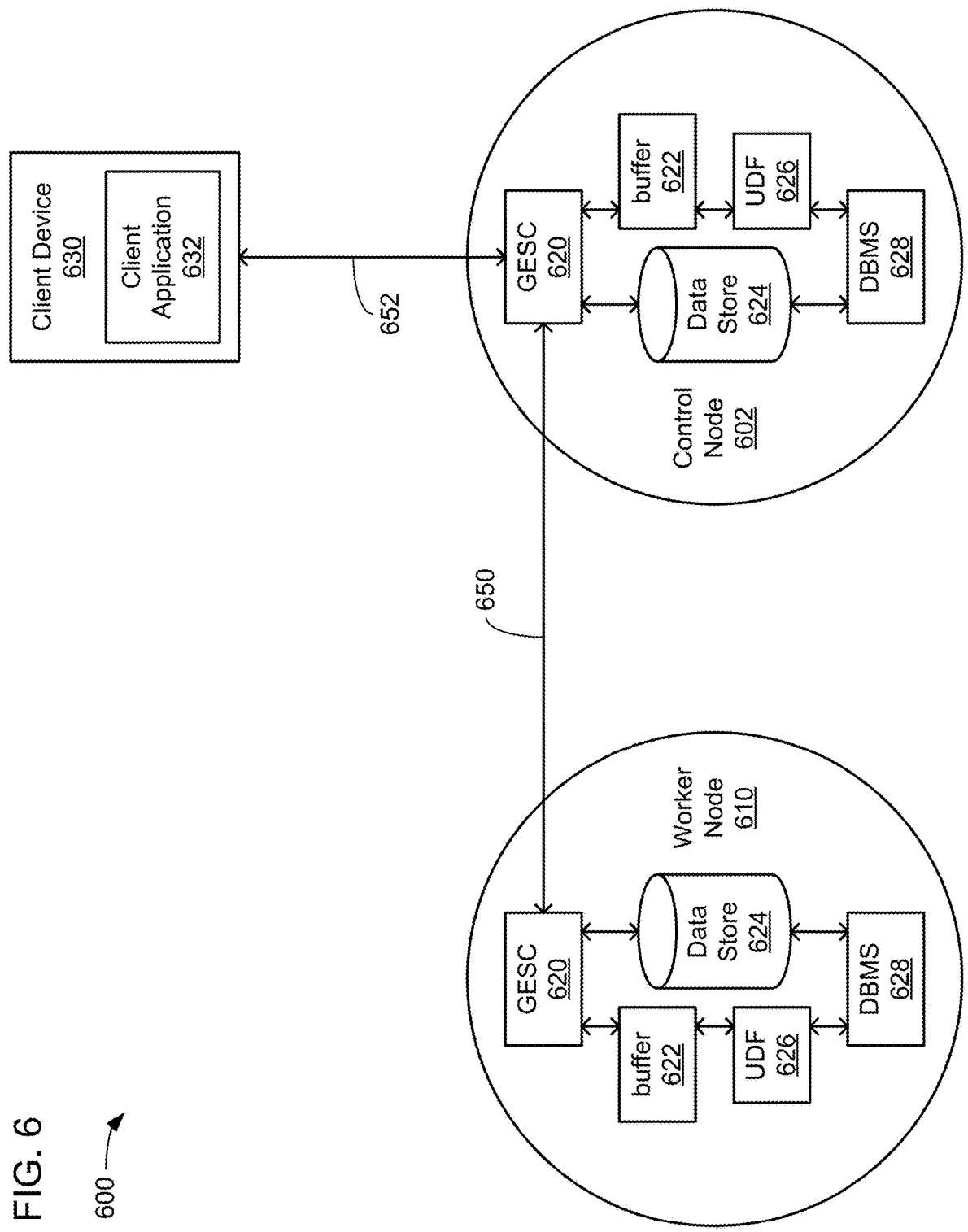
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
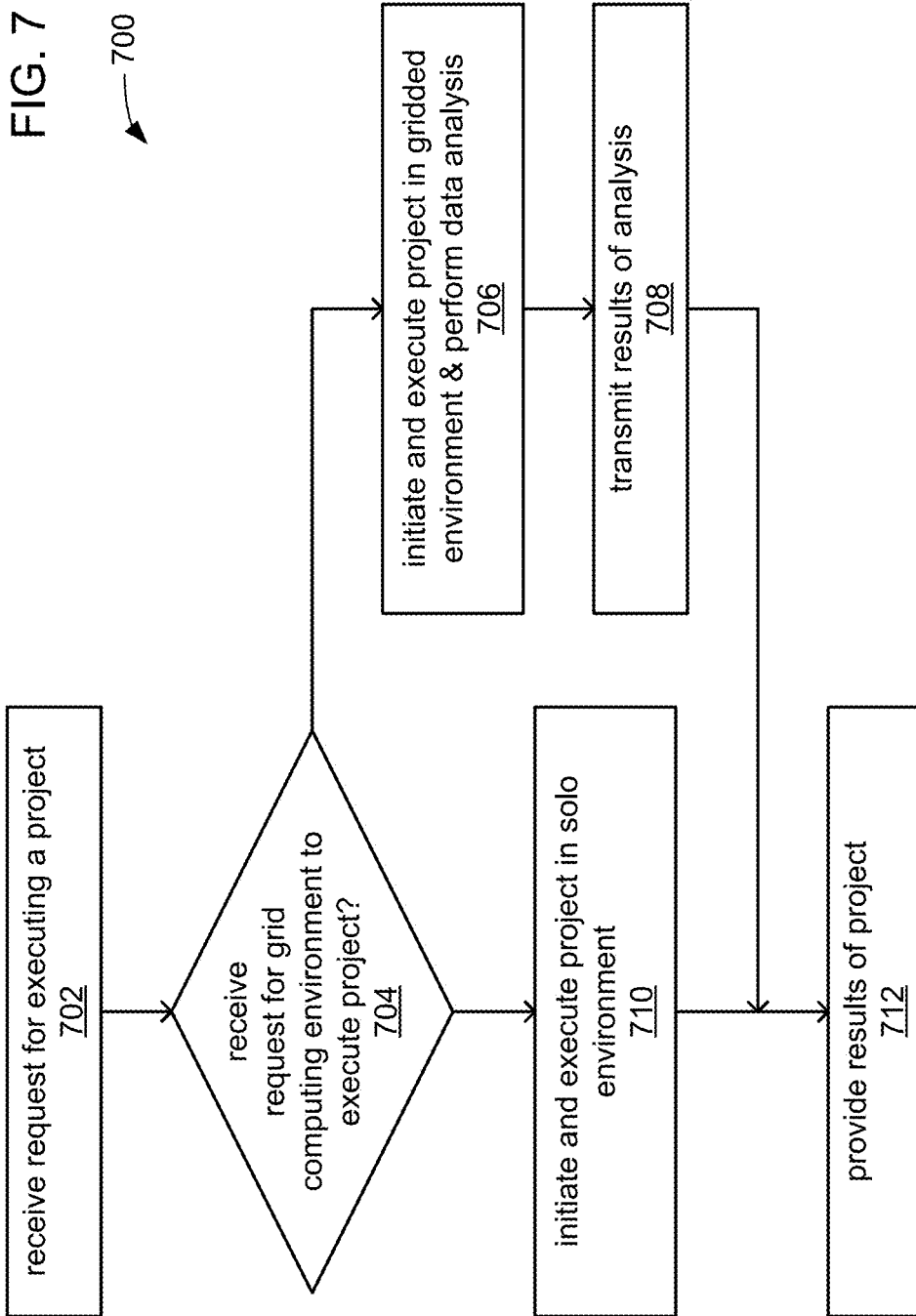
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
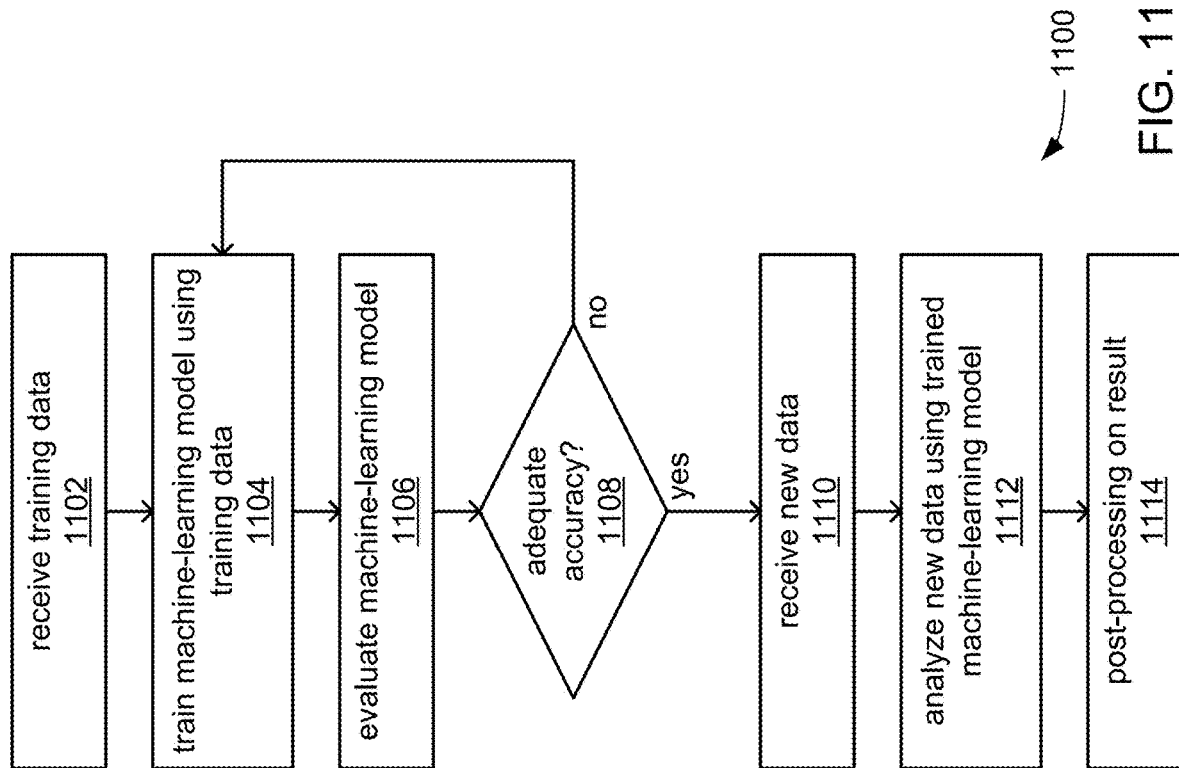
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
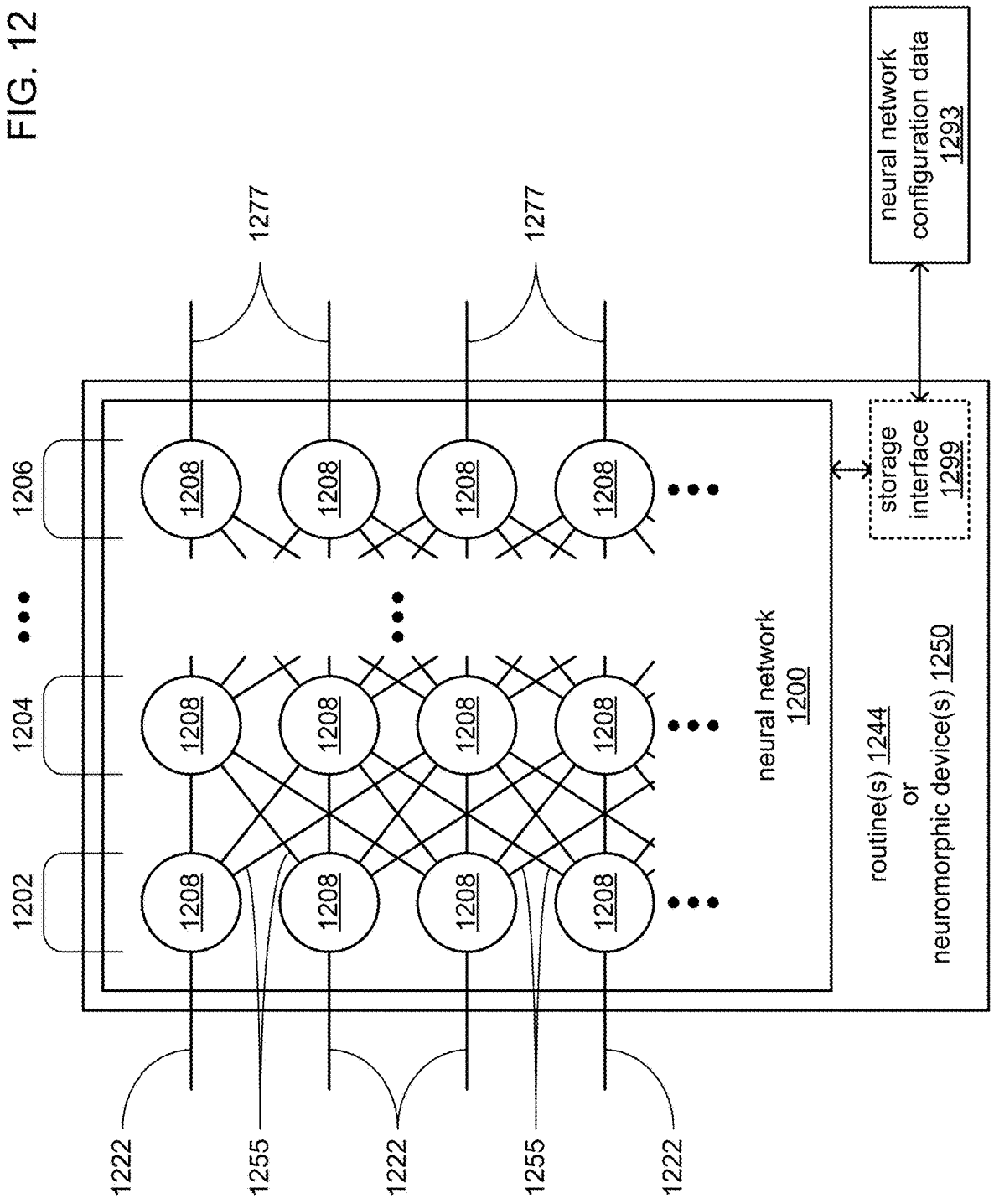
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
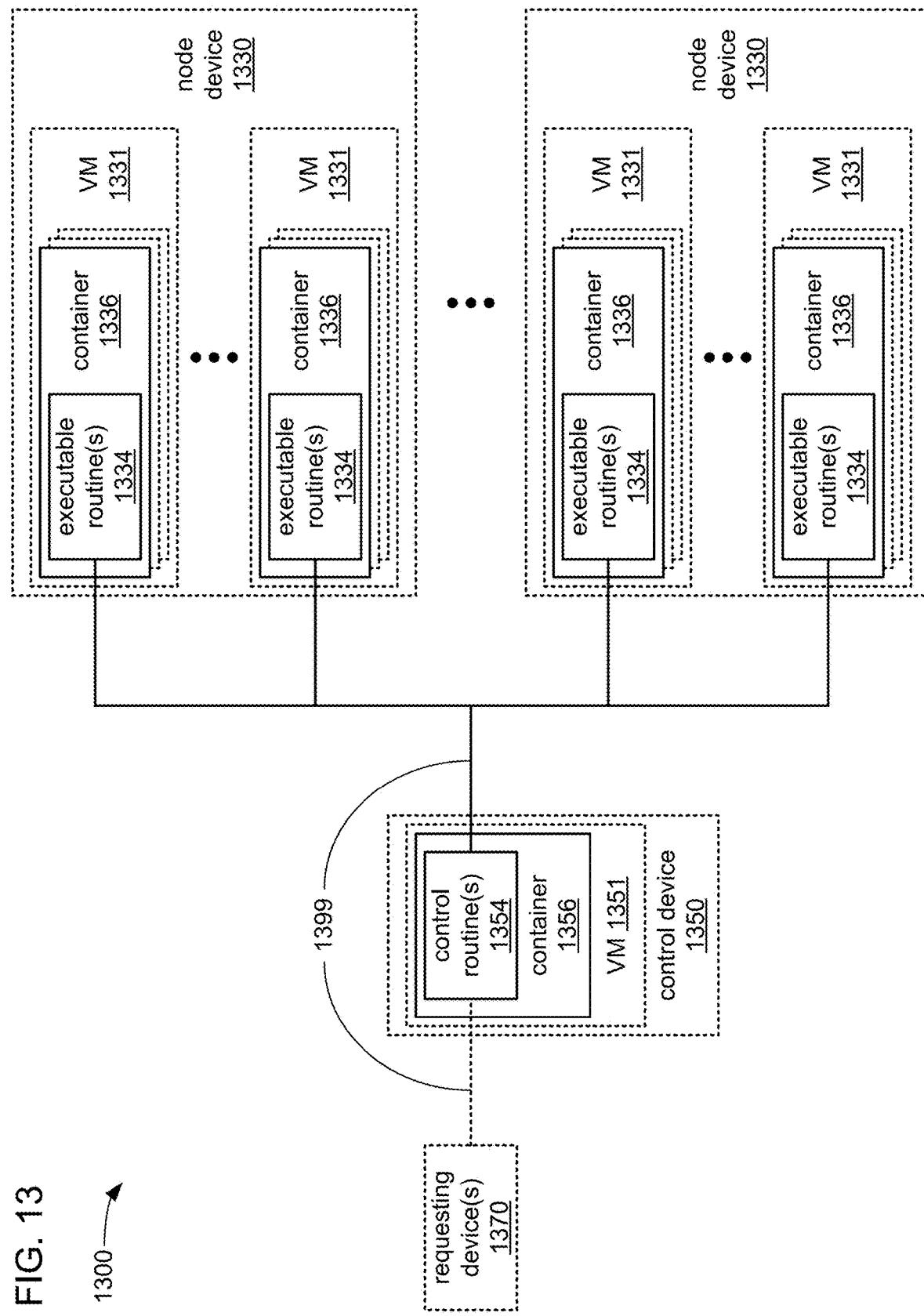
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions.

By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

Figure 14:
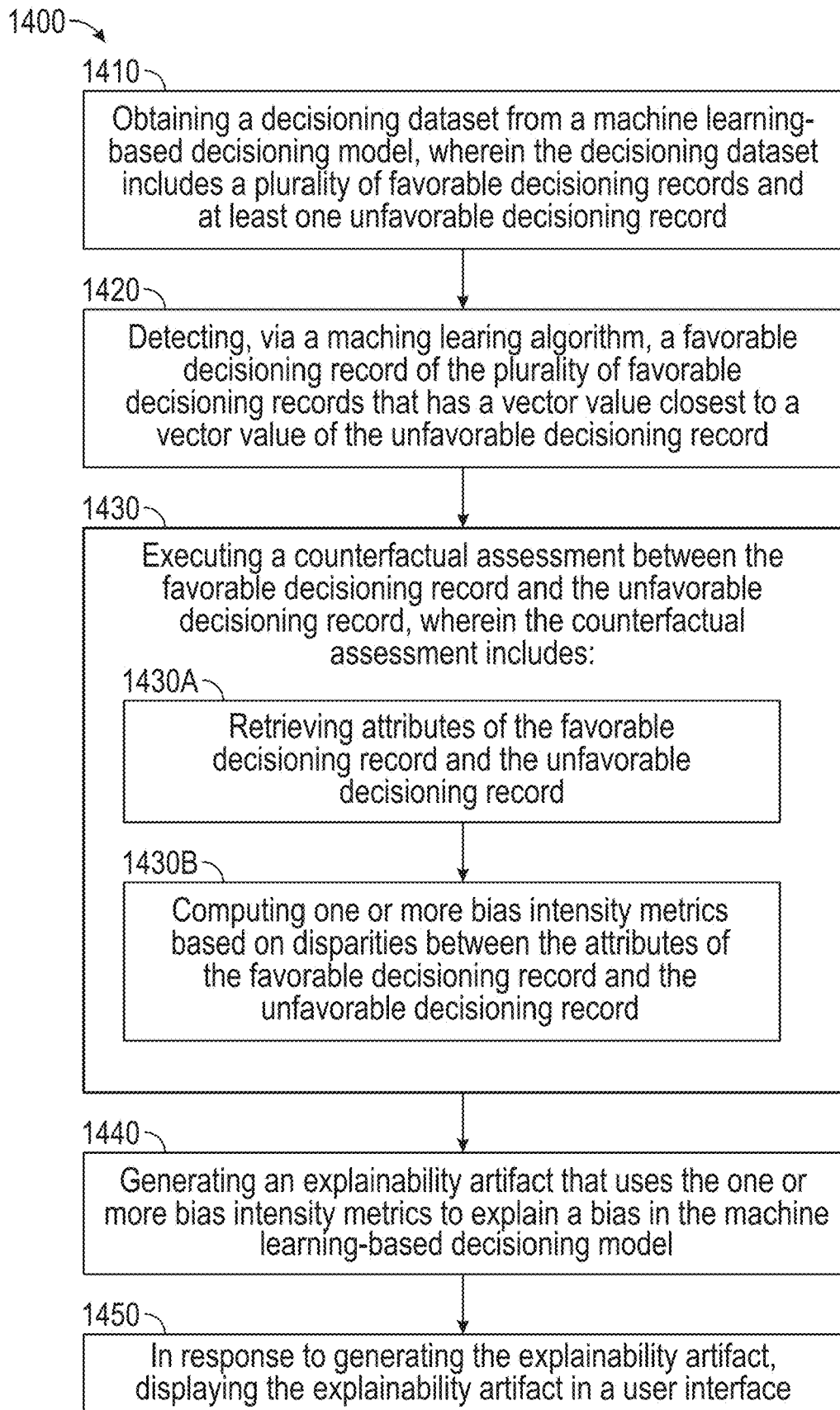
FIG. 14 illustrates an example of a method for detecting bias in a machine learning-based decisioning model, according to some embodiments of the present technology.

FIG. 14 illustrates an example of method 1400 executing counterfactual assessments between favorable decisioning records and unfavorable decisioning records to identify bias in a decisioning model. It shall be appreciated that other embodiments contemplated within the scope of the present disclosure may involve more processes, fewer processes, different processes, or a different order of processes than illustrated in FIG. 14.

As described in more detail herein, method 1400 may be used to determine if a decisioning model is biased. Specifically, to determine if a decisioning model is biased, method 1400 may obtain a decisioning dataset comprising favorable and unfavorable decisions (e.g., predictions) made by the decisioning model. In turn, based on obtaining the decisioning dataset, method 1400 may perform one or more counterfactual assessments to identify if unfavorable decisions generated by the decisioning model are correct or attributable to bias. Furthermore, in some embodiments, method 1400 may display the outcomes of the counterfactual assessments in a user interface to visually emphasize any bias detected in the decisioning model (and the factors contributing to such bias, if applicable).

Utilizing method 1400 in the manner described herein may result in numerous technical advantages. Firstly, method 1400 may provide explainability and transparency into the decision-making process of the decisioning model. Specifically, in some embodiments, method 1400 may visually display how the decisioning model arrived at a decision and if any bias exists in such a decision. Such a technical advantage may enable end users to have a deeper understanding into the decision making process of the decisioning model and an increased amount of trust in the decisioning model as compared to decisions that are not explained via method 1400 (e.g., without method 1400, the decisioning model may operate as a "black box" that provides little insight into its internal decision making process).

Secondly, the embodiments of method 1400 may enable bias to be detected in a structured and repeatable manner. Specifically, as described herein, method 1400 may perform one or more counterfactual assessments that assess one or more unfavorable decisioning records in the decisioning dataset against their closest favorable counterparts. The systematic approach of counterfactual assessments—as described herein—may enable the detection of attributes that (e.g., consistently) differentiate favorable outcomes from unfavorable ones. Thirdly, method 1400 may enable a user to implement bias mitigating actions from the insights outputted by the counterfactual assessments. By visually emphasizing (e.g., displaying) specific attributes that lead to biased decisions, end users may be able to execute a bias mitigation process that increases fairness in the decision making process and minimizes the influence of attributes causing bias. It shall be noted that the above-described technical benefits are only a subset of the advantages of method 1400 and that a person of ordinary skill in the art will appreciate further advantages of method 1400 throughout the disclosure.

As shown in FIG. 14, process 1410 of method 1400 may obtain a decisioning dataset from a machine learning-based decisioning model. For instance, in the example of FIG. 15A, process 1410 may obtain decisioning dataset 1504 from machine learning-based decisioning model 1502. Machine learning-based decisioning model 1502, as generally used herein, may relate to any suitable model that is configured to receive an input of data and generate a decision (e.g., prediction) based on the input of data. It shall be noted that, while process 1410 describes obtaining a decisioning dataset from "a machine learning-based decisioning model," other embodiments of process 1410 may include obtaining a decisioning dataset from other types of decisioning models, such as rule-based decisioning models, heuristic-based decisioning models, and/or decisioning models employing a combination of machine learning and rule-based models (also referred to herein as "sub-models").

Additionally, decisioning dataset 1504, as generally used herein, may refer to a dataset comprising one or more decisioning records. Specifically, as illustrated in FIG. 14, in some embodiments, the decisioning dataset obtained by process 1410 may include a plurality of favorable decisioning records and at least one unfavorable decisioning record. For example, as shown in FIG. 15B, decisioning dataset 1504 may include a plurality of favorable decisioning records 1506A-1506E and a plurality of unfavorable decisioning records 1508A-1508E. It shall be noted that the example illustrated in FIG. 15B is not intended to be limiting and that decisioning dataset 1504 may include additional favorable or unfavorable decisioning records, fewer favorable or unfavorable decisioning records, or different favorable or unfavorable decisioning records without departing from the scope of the disclosure.

In some embodiments, a respective favorable decisioning record, as generally used herein, may relate to an entry in dataset 1504 for which machine learning-based decisioning model 1502 generated a positive prediction. For instance, as illustrated in FIG. 15B, favorable decisioning records 1506A-1506E may include a value for decision attribute 1516N that indicates a positive decision made by machine learning-based decisioning model 1502 (e.g., represented by the text "Favorable"). Conversely, a respective unfavorable decisioning record, as generally used herein, may relate to an entry in dataset 1504 that relates to a negative prediction made by machine learning-based decisioning model 1502. For instance, as also illustrated in FIG. 15B, unfavorable decisioning records 1508A-1508E may include a value for decision attribute 1516N that indicates a negative decision by machine learning-based decisioning model 1502 (e.g., represented by the text "Unfavorable").

Additionally, as illustrated in FIG. 15B, dataset 1504 may include one or more attributes 1516A-1516N. Specifically, as illustrated in FIG. 15B, attributes 1516A-1516N may include an attribute 1516A named "ID", attributes 1516B-1516G named "Features A-F", respectively, and/or an attribute 1516N named "Decision." A respective decisioning record of dataset 1504, in some embodiments, may include values corresponding to such attributes 1516A-1516N. For instance, as illustrated in FIG. 15B, favorable decisioning record 1506A may include a value corresponding to attribute 1516A (e.g., represented as "ID 1"), values corresponding to attributes 1516B-1516G (e.g., represented as "Values A1-F1"), and a value corresponding to decision attribute 1516N (e.g., represented as "Favorable"). The remaining decisioning records of dataset 1504 (e.g., records 1506B-1506E and 1508A-1508E) may also include values for attributes 1516A-1516N in analogous ways described with reference to favorable decisioning record 1506A.

In some embodiments, attributes 1516A-1516N may include an account score attribute and/or a resource attribute. For instance, in some embodiments, attributes 1516B and 1516C illustrated in FIG. 15B may correspond to an account score attribute and a resource attribute, respectively. The term "account score attribute," as generally used herein, may refer to a numerical or categorical attribute that quantifies a risk associated with a respective decisioning record of dataset 1504. Conversely, the term "resource score attribute," as generally used herein, may refer to a numerical or categorical attribute that quantifies an availability of a resource for a respective decisioning record of dataset 1504. It shall be noted that attributes 1516A-1516N illustrated in FIG. 15B are not intended to be limiting and that other embodiments of dataset 1504 may include additional, fewer, or different attributes than illustrated without departing from the scope of the disclosure.

Referring to FIG. 14, in some embodiments, process 1420 of method 1400 may detect, via a machine learning algorithm, a favorable decisioning record of the plurality of favorable decisioning records that has a vector value closest to a vector value of the unfavorable decisioning record. For instance, in the example of FIG. 15B, method 1400 may use process 1420 to detect which favorable decisioning record (e.g., a first favorable decisioning record) of the plurality of favorable decisioning records 1506A-1506E has a vector value closest to a vector value of unfavorable decisioning record 1508A. Additionally, in embodiments where dataset 1504 includes a plurality of unfavorable decisioning records, method 1400 may analogously execute process 1420 one or more additional times. For instance, as described previously in FIG. 15B, dataset 1504 may additionally include unfavorable decisioning records 1508B-1508E. Accordingly, in some embodiments, process 1420 may additionally detect decisioning records that have vector values closest to the vector values of unfavorable decisioning records 1508B-1508E, respectively.

Figure 15A:
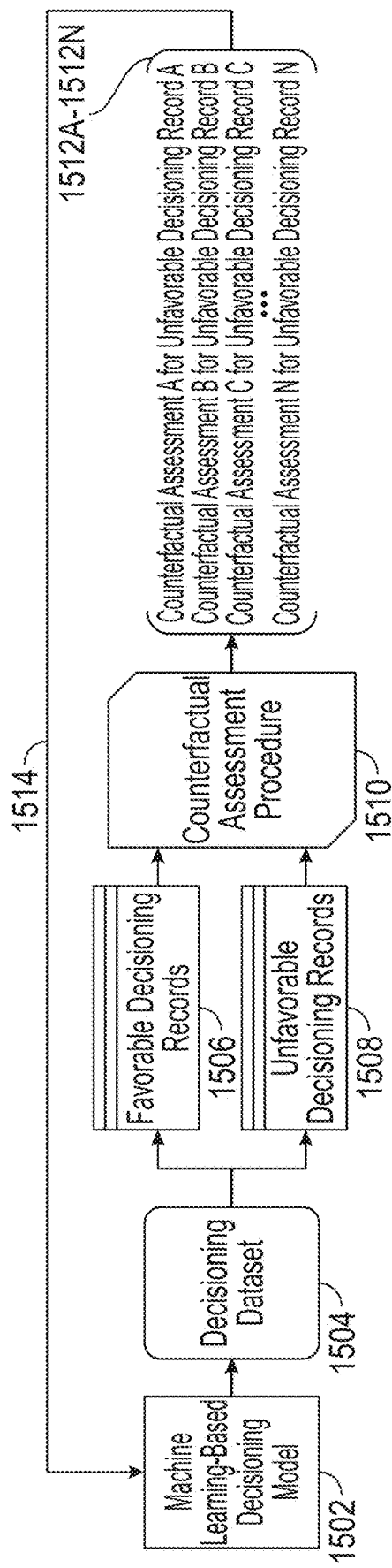
FIG. 15A illustrates an example of generating one or more counterfactual assessments for a decisioning dataset, according to some embodiments of the present technology.
Figure 15C:
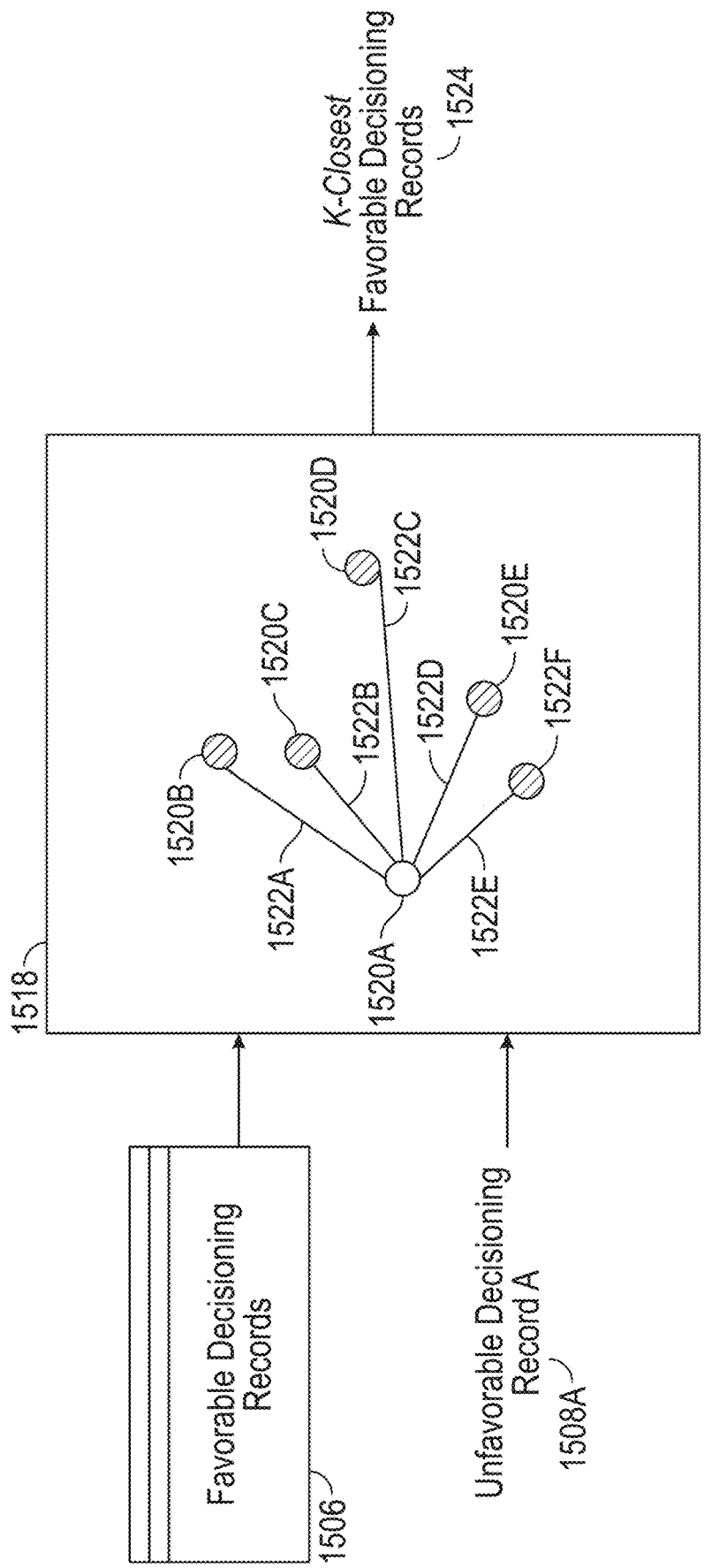
FIG. 15C illustrates an example of a machine learning model detecting favorable decisioning records nearest to an unfavorable decisioning record, according to some embodiments of the present technology.

In some embodiments, as illustrated in FIG. 15C, process 1420 may use machine learning algorithm 1518 to detect a favorable decisioning record that has a vector value closest to a respective unfavorable decisioning record. Machine learning algorithm 1518, as generally used herein, may be any suitable parametric or non-parametric classification algorithm (e.g., machine learning model). For instance, in some embodiments, machine learning algorithm 1518 may be a k-nearest neighbor (KNN) algorithm, a support vector machine (SVM) algorithm, a support vector data description algorithm (SVDD), and/or the like. Machine learning algorithm 1518, as illustrated in FIG. 15C, may also be configured to return K-closest favorable decisioning records 1524 for a respective unfavorable decisioning record. For example, if K=1, machine learning algorithm 1518 may output a favorable decisioning record of the plurality of favorable decisioning records 1506A-1506E that has a vector value closest to the vector value of such unfavorable decisioning record.

Analogously, if K=2, machine learning algorithm 1518 may output a favorable decisioning record and a second favorable decisioning record of the plurality of favorable decisioning records 1506A-1506E that have vector values closest and second closest to the vector value of such unfavorable decisioning record. It shall be noted that, in other embodiments, the value of K in machine learning algorithm 1518 may be different from the examples described above and that machine learning algorithm 1518 would operate in an analogous manner for the other possible values of K.

In some embodiments, machine learning algorithm 1518 may be configured to receive an input of a plurality of favorable decisioning records and a target unfavorable decisioning record. For instance, as illustrated in FIG. 15C, machine learning algorithm 1518 may receive unfavorable decisioning record 1508A and favorable decisioning records 1506 (e.g., favorable decisioning records 1506A-1506E) as input. In turn, machine learning algorithm 1518 may convert unfavorable decisioning record 1508A and favorable decisioning records 1506 to vector values. The term "vector value," as generally used herein, may refer to a numerical representation of a respective decisioning record in a multi-dimensional space. Specifically, as illustrated in FIG. 15C, machine learning algorithm 1518 may compute a vector value 1520A corresponding to unfavorable decisioning record 1508A and may compute vector values 1520B-1520F corresponding to favorable decisioning records 1506A-1506E, respectively.

In some embodiments, machine learning algorithm 1518 may compute one or more vector distances between a vector value of a target unfavorable decisioning record and the vector values of the favorable decisioning records. For instance, as also shown in FIG. 15C, machine learning algorithm 1518 may compute a plurality of vector distances 1522A-1522E. The term "vector distance," as generally used herein, may refer to a magnitude or measure of the separation between vector values in a multi-dimensional space. For instance, in some embodiments, a vector distance may represent the Euclidean distance, cosine distance, or any other suitable distance metric that quantifies a distance between a pair of vector values.

Specifically, as illustrated in FIG. 15C, vector distances 1522A-1522E may represent a (e.g., Euclidean, cosine, etc.) distance between the vector value 1520A corresponding to unfavorable decisioning record 1508A and the vector values 1520B-1520F corresponding to favorable decisioning records 1506A-1506E, respectively. Returning the K-closest favorable decisioning records 1524, in some embodiments, may include identifying the K-smallest vector distances among the plurality of vector distances 1522A-1522E and, in turn, returning the favorable decisioning records associated with the K-smallest vector distances. For instance, in a first non-limiting example, if K of machine learning algorithm 1518 equals one (1), machine learning algorithm 1518 may identify a smallest vector distance among the plurality of vector distances 1522A-1522E and, in turn, output the favorable decisioning record associated with the smallest vector distance. Conversely, in a second non-limiting example, if K of machine learning algorithm 1518 equals two (2), machine learning algorithm 1518 may identify a smallest and a second smallest vector distance among the plurality of vector distances 1522A-1522E and, in turn, output the favorable decisioning records associated with the smallest and second smallest vector distance.

For instance, with reference to the first non-limiting example (e.g., K=1), machine learning algorithm 1518 may identify that the vector distance 1522E between the vector value 1520A corresponding to unfavorable decisioning record 1508A and the vector value 1520F corresponding to favorable decisioning record 1506E represents the smallest distance among vector distances 1522A-1522E. Accordingly, in such an example, machine learning algorithm 1518 may output favorable decisioning record 1506E as the closest favorable decisioning record to unfavorable decisioning record 1508A.

In some embodiments, process 1420 may provide a plurality of inputs to machine learning algorithm 1518 (e.g., such as when dataset 1504 includes a plurality of unfavorable decisioning records). A respective input provided to machine learning algorithm 1518, as generally referred to herein, may comprise a plurality of favorable decisioning records and a respective unfavorable decisioning record included in dataset 1504 (as generally illustrated in the example of FIG. 15C). For instance, in the example of FIGS. 15B and 15C, process 1420 may additionally provide machine learning algorithm 1518 with inputs corresponding to unfavorable decisioning records 1508B-1508E.

Specifically, an input corresponding to unfavorable decisioning record 1508B may include favorable decisioning records 1506 and unfavorable decisioning record 1508B. Conversely, an input corresponding to unfavorable decisioning record 1508C may include favorable decisioning records 1506 and unfavorable decisioning record 1508C. Moreover, an input corresponding to unfavorable decisioning record 1508D may include favorable decisioning records 1506 and unfavorable decisioning record 1508D. Lastly, an input corresponding to unfavorable decisioning record 1508E may include favorable decisioning records 1506 and unfavorable decisioning record 1508E. Based on machine learning algorithm 1518 receiving the additional inputs corresponding to unfavorable decisioning records 1508B-1508E, machine learning algorithm 1518 may perform operations similar to those described for unfavorable decisioning record 1508A in FIG. 15C.

Referring to FIG. 14, in some embodiments, process 1430 of method 1400 may include executing a counterfactual assessment between the favorable decisioning record and the unfavorable decisioning record. For instance, if—for the reasons described previously in FIG. 15C—the K-closest favorable decisioning records 1524 include favorable decisioning record 1506E, process 1430 may perform a counterfactual assessment between unfavorable decisioning record 1508A and favorable decisioning record 1506E. A counterfactual assessment, as generally used herein, may refer to an evaluation that detects (e.g., identifies) differences between the attributes of an unfavorable decisioning record and the attributes of one or more favorable decisioning records (also referred to as "counterfactual records").

In some embodiments, as illustrated in FIG. 14, process 1430 may include a sub-process 1430A that retrieves (e.g., one or more) attributes of the favorable decisioning record and the unfavorable decisioning record. For instance, as described above, process 1430 may execute (e.g., perform) a counterfactual assessment between unfavorable decisioning record 1508A and favorable decisioning record 1506E. Accordingly, based on process 1430 executing the counterfactual assessment between unfavorable decisioning record 1508A and favorable decisioning record 1506E, sub-process 1430A may retrieve one or more attributes of the unfavorable decisioning record 1508A and the favorable decisioning record 1506E. Specifically, in the example of FIG. 15B, sub-process 1430A may retrieve a value of one or more attributes 1516A-1516N in unfavorable decisioning 1508A and the favorable decisioning record 1506E.

Additionally, as illustrated in FIG. 14, process 1430 may include a sub-process 1430B that computes one or more bias intensity metrics based on disparities between the attributes of the favorable decisioning record and the unfavorable decisioning record. A respective bias intensity metric, as generally used herein, may represent a difference between a respective attribute of an unfavorable decisioning record and a favorable decisioning record. For instance, as shown in the example FIG. 15D, based on obtaining the attributes of unfavorable decisioning record 1508A and favorable decisioning record 1506E, process 1430B may compute one or more bias intensity metrics 1534A-1534E.

Specifically, in row 1532A, bias intensity metric 1534A may represent a difference between the value of attribute 1516B in unfavorable decisioning record 1508A and favorable decisioning record 1506E. Conversely, in row 1532A, bias intensity metric 1534B may represent a difference between the value of attribute 1516C in unfavorable decisioning record 1508A and favorable decisioning record 1506E. Furthermore, in row 1532A, bias intensity metric 1534C may represent a difference between the value of attribute 1516D in unfavorable decisioning record 1508A and favorable decisioning record 1506E. Moreover, in row 1532A, bias intensity metric 1534D may represent a difference between the value of attribute 1516E in unfavorable decisioning record 1508A and favorable decisioning record 1506E. Lastly, in row 1532A, bias intensity metric 1534E may represent a difference between the value of attribute 1516F in unfavorable decisioning record 1508A and favorable decisioning record 1506E.

In some embodiments, the one or more bias intensity metrics 1534A-1534E may include an account score bias intensity metric. For instance, as described previously in process 1420, attribute 1516B may correspond to an account score attribute. Accordingly, in some embodiments of row 1532A, the bias intensity metric 1534A corresponding to the attribute 1516B may be an account score bias intensity metric that represents the difference between the value of attribute 1516B in unfavorable decisioning record 1508A (e.g., a first account score) and the value of attribute 1516B in favorable decisioning record 1506E (e.g., a second account score).

Furthermore, in some embodiments, the one or more bias intensity metrics 1534A-1534E may include a resource bias intensity metric. For instance, as described previously in process 1420, attribute 1516C may correspond to a resource attribute. Accordingly, in some embodiments of row 1532A, the bias intensity metric 1534B corresponding to the attribute 1516C may be a resource score bias intensity metric that represents the difference between the value of attribute 1516C in unfavorable decisioning record 1508A (e.g., a first resource score) and the value of attribute 1516C in favorable decisioning record 1506E (e.g., a second resource score).

In some embodiments, sub-processes 1430A and 1430B may perform operations associated with a plurality of favorable decisioning records. For instance, in another non-limiting example of FIGS. 15C and 15D, the K-closest favorable decisioning records 1524 to unfavorable decisioning record 1508A may include favorable decisioning records 1506D and 1506E (e.g., when K=2). Accordingly, in some embodiments, sub-process 1430A may retrieve a value of one or more attributes 1516A-1516N of the unfavorable decisioning record 1508A, the favorable decisioning record 1506D, and the favorable decisioning record 1506E.

In turn, based on retrieving one or more attributes of the unfavorable decisioning record 1508A and the favorable decisioning records 1506D, sub-process 1430B may compute—in analogous ways described above-one or more bias intensity metrics (also referred to as "one or more first bias intensity metrics") that represent differences between the attributes of the unfavorable decisioning record 1508A and the favorable decisioning record 1506D. Additionally, in some embodiments, based on retrieving one or more attributes of the unfavorable decisioning record 1508A and the favorable decisioning records 1506E, sub-process 1430B may compute—in analogous ways described above-one or more bias intensity metrics (also referred to as "one or more second bias intensity metrics") that represent differences between the attributes of the unfavorable decisioning record 1508A and the favorable decisioning record 1506E. It shall be noted that the above-described example is not intended to be limiting and that analogous sub-processes 1430A and 1430B may perform analogous operations for different values of K (e.g., K greater than two (2)).

In some embodiments, as illustrated in FIG. 15A, one or more operations of process 1430 may be performed via a counterfactual assessment procedure 1510. Counterfactual assessment procedure 1510, as generally used herein, may refer to a computer-executable procedure (e.g., function, program, etc.) that is configured to receive an input comprising one or more favorable and unfavorable decisioning records and, in turn, perform one or more counterfactual assessments for the inputted unfavorable decisioning records. For instance, as illustrated in FIG. 15A, counterfactual assessment procedure 1510 may receive favorable decisioning records 1506 (e.g., records 1506A-1506E in FIG. 15B) and unfavorable decisioning records 1508 (e.g., records 1508A-1508E in FIG. 15B) as input. In turn, based on the input, counterfactual assessment procedure 1510 may perform one or more counterfactual assessments 1512A-1512N.

In some embodiments, counterfactual assessment 1512A may refer to the above-described counterfactual assessment that process 1430 performed for the unfavorable decisioning record 1508A illustrated in FIG. 15B ("Unfavorable Decisioning Record A"). Analogously, as also illustrated in FIG. 15B, counterfactual assessments 1512B-1512N may include or correspond to counterfactual assessments performed for unfavorable decisioning records 1508B-1508E ("Unfavorable Decisioning Records B-E"), respectively. It shall be noted that, in some embodiments, counterfactual assessment procedure 1510 may perform the counterfactual assessments 1512B-1512N in a manner analogous to the counterfactual assessment performed for unfavorable decisioning record 1508A (e.g., counterfactual assessment 1512A).

Figure 15D:
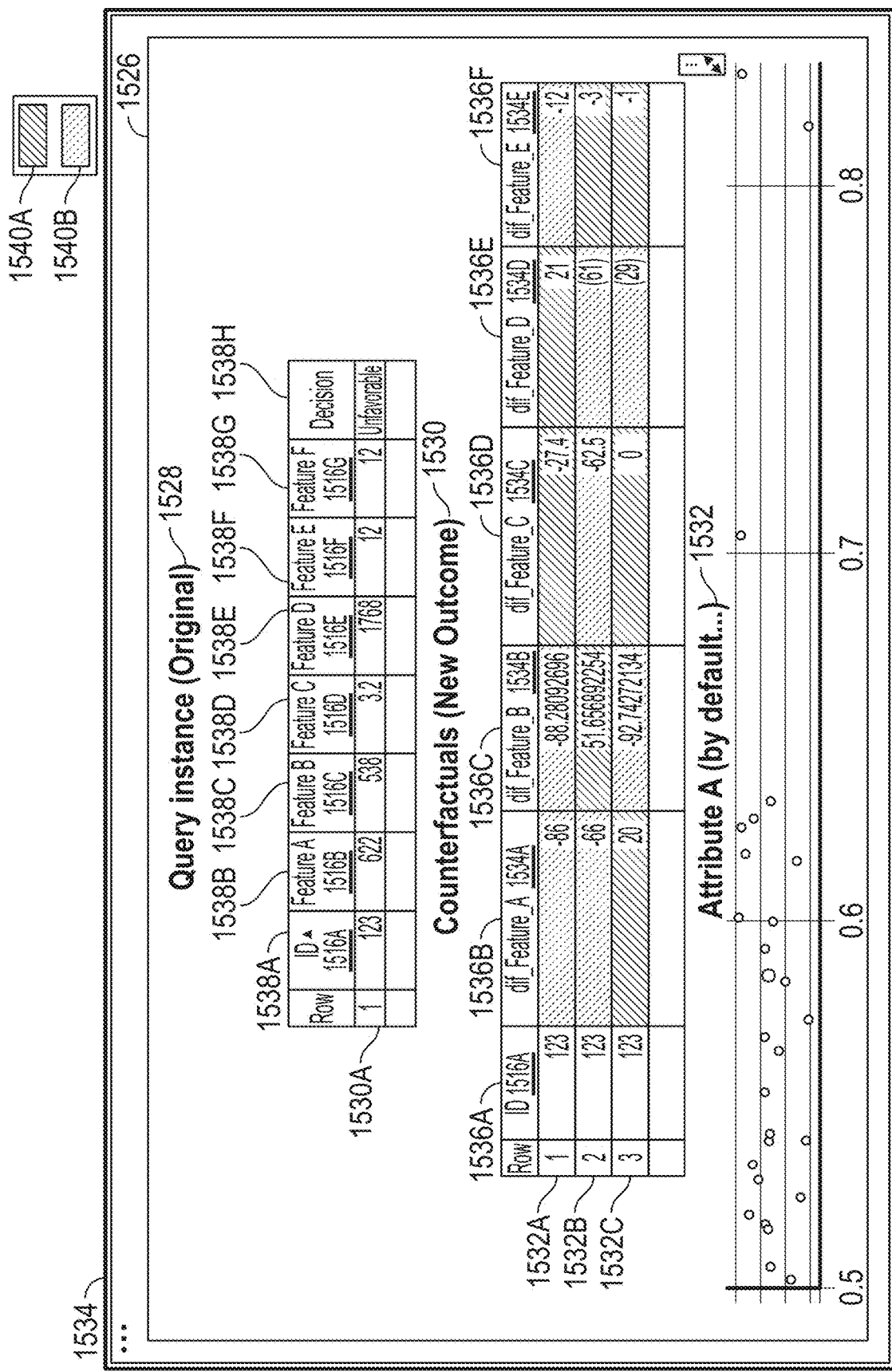
FIG. 15D illustrates an example of an explainability artifact, according to some embodiments of the present technology.

Referring to FIG. 14, in some embodiments, process 1440 of method 1400 may generate an explainability artifact that uses one or more bias intensity metrics to explain a bias in the machine-learning based decisioning model. Additionally, as illustrated in FIG. 14, in response to generating the explainability artifact, process 1450 may display the explainability artifact in a user interface. For instance, as shown in FIG. 15D, process 1450 may display explainability artifact 1526 in user interface 1534 after (e.g., in response to) process 1440 generating explainability artifact 1526.

In some embodiments, explainability artifact 1526 may include (e.g., display) one or more data visualization components. Specifically, as illustrated in FIG. 15D, explainability artifact 1526 may include a first table component 1528, a second table component 1530, and/or a graph component 1532. The first table component 1528, in some embodiments, may include one or more rows corresponding to one or more unfavorable decisioning records. For instance, as illustrated in FIG. 15D, the first table component 1528 may include a row 1530A that corresponds to unfavorable decisioning record 1508A. Additionally, in some embodiments, the first table component 1528 may include one or more columns corresponding to one or more attributes of an unfavorable decisioning record. For instance, as also illustrated in FIG. 15D, the first table component 1528 may include columns 1538A-1538H corresponding to the attributes 1516A-1516N of unfavorable decisioning record 1508A.

Furthermore, a respective row of the first table component 1528 may include (e.g., store) values for one or more columns of the first table component. For instance, as also illustrated in FIG. 15D, the row 1530A corresponding to unfavorable decisioning record 1508A may store a value of the attributes 1516A-1516N across columns 1538A-1538H. Specifically, as illustrated in FIG. 15D, at columns 1538A-1538H, row 1530A corresponding to unfavorable decisioning record 1508A may include the values of the attributes 1516A-1516N associated with unfavorable decisioning record 1508A (e.g., "123," "622," "538," "3.2," "1768," "12," "1.2," and "Unfavorable," respectively). It shall be noted that the above example is not intended to be limiting and that first table component 1528 may display one or more other rows corresponding to one or more other unfavorable decisioning records in analogous ways described with respect to unfavorable decisioning record 1508A.

Additionally, in some embodiments, the second table component 1530 may include one or more rows corresponding to the K-closest favorable decisioning records 1524 returned by machine learning algorithm 1518. For instance, in the example of FIGS. 15C and 15D, the K-closest favorable decisioning records 1524 returned by machine learning algorithm 1518 may include favorable decisioning records 1506A-1506C that have vector values that is closest, second closest, and third closest to unfavorable decisioning record 1508A (e.g., K=3), respectively. Additionally, as shown in FIG. 15D, based on machine learning algorithm 1518 detecting favorable decisioning records 1506A-1506C, processes 1440-1450 may generate and displays rows 1532A-1532C corresponding to favorable decisioning records 1506A-1506C. It shall be noted that the above example is not intended to be limiting and that if the K-closest favorable decisioning records 1524 included additional, fewer, or different favorable decisioning records, the second table component 1530 may analogously include additional, fewer, or different favorable decisioning records.

Additionally, in some embodiments, the second table component 1530 may include one or more columns corresponding to the one or more bias intensity metrics that were computed by sub-process 1430B and/or may include one or more columns corresponding to attributes of the favorable decisioning records. For instance, as shown in FIG. 15D, the second table component 1530 may include a column 1536A that corresponds to attribute 1516A in FIG. 15B and/or may include columns 1536B-1536F corresponding to bias intensity metrics 1534A-1534E, respectively. Furthermore, in some embodiments, a respective row of second table component 1530 may include (e.g., store) values for one or more of the columns 1536A-1536F. For instance, as also shown in FIG. 15D, the row 1532A corresponding to favorable decisioning record 1506A may store the value of attribute 1516A and the value of one or more bias intensity metrics 1534A-1534E associated with favorable decisioning record 1506A across columns 1536A-1536F, respectively. The remaining rows in second table component 1530 (e.g., rows 1532B and 1532C) may store values for one or more attributes and/or one or more bias intensity metrics associated with a corresponding favorable decisioning record in analogous ways described with reference to row 1532A.

In some embodiments, the explainability artifact 1526 may indicate one or more factors contributing to (e.g., causing) bias in a machine learning-based decisioning model—described previously in process 1410. Process 1440 may determine that a factor contributes to bias when a corresponding bias intensity metric is less than a (e.g., pre-defined) threshold value/amount (e.g., 1, 2, 4, 10, 20, 50, 70, etc.). Based on process 1440 determining that a bias intensity metric is less than the threshold amount, the explainability artifact may display the bias intensity metric with visual emphasis to indicate that the attribute associated with the bias intensity metric is a factor contributing to bias in the machine learning-based decisioning model. For instance, as illustrated in FIG. 15D, process 1440 may determine that the value of bias intensity metric 1534C in row 1532A does not exceed the (e.g., pre-defined) threshold amount. Accordingly, as also shown in FIG. 15D, based on process 1440 determining that the value of bias intensity metric 1534C in row 1532A does not exceed the threshold amount, the explainability artifact 1526 may display the value of bias intensity metric 1534C in row 1532A with visual emphasis 1540A that indicates the attribute corresponding to bias intensity metric 1534C (e.g., attribute 1516D in FIG. 15B) is a factor contributing to bias in the machine learning-based decisioning model.

Conversely, in some embodiments, process 1440 may determine that a factor does not contribute to the bias in the machine learning-based decisioning model when a corresponding bias intensity metric is more than a (e.g., pre-defined) threshold value/amount (e.g., 1, 2, 4, 10, 20, 50, 70, etc.). For instance, in the example of FIG. 15D, process 1440 may determine that the value of bias intensity metric 1534A in row 1532A exceeds the (e.g., pre-defined) threshold amount. Accordingly, as also shown in FIG. 15D, based on process 1440 determining that the value of bias intensity metric 1534A in row 1532A exceeds the (e.g., pre-defined) threshold amount, the explainability artifact 1526 may display the value of bias intensity metric 1534A in row 1532A with visual emphasis 1540B that indicates the attribute corresponding to bias intensity metric 1534A (e.g., attribute 1516B in FIG. 15B) is not a factor contributing to bias in the machine learning-based decisioning model.

It shall be noted that other values in rows 1532A-1532C may be displayed with visual emphasis 1540A or 1540B for analogous reasons described above. It shall also be noted that, in some embodiments, the explainability artifact 1526 may use visual emphasis 1540A to indicate an unfairness of a machine learning-based decisioning model and visual emphasis 1540B to indicate a fairness of the machine learning-based decisioning model. For instance, in the example of FIG. 15D, process 1440 may determine that the value of the bias intensity metric 1534A in row 1532A indicates that the difference between the attribute 1516B (e.g., Feature A in FIG. 15B) in favorable decisioning record 1506A and unfavorable decisioning record 1508A is more than a threshold amount. Accordingly, in some embodiments, the explainability artifact 1526 may display the value of the bias intensity metric 1534A in row 1532A with visual emphasis 1540B to indicate a fairness of the machine learning-based decisioning model.

It shall be noted that, in some embodiments, if process 1440 instead determined that the value of the bias intensity metric 1534A in row 1532A indicates that the difference between the attribute 1516B (e.g., Feature B in FIG. 15B) in favorable decisioning record 1506A and unfavorable decisioning record 1508A is less than the threshold amount, the explainability artifact 1526 may instead display the value of the bias intensity metric 1534A in row 1532A with visual emphasis 1540A to indicate an unfairness of the machine learning-based decisioning model.

In some embodiments, graph component 1532 may graph (e.g., plot) a distribution of a respective attribute shared among one or more unfavorable decisioning records. For instance, as shown in FIG. 15D, in some embodiments, graph component 1532A may plot the distribution of attribute 1516A ("Feature A") among the plurality of unfavorable decisioning records 1508A-1508E. It shall be noted that graph component 1532 may correspond to any suitable type of graph including, but not limited to, a t-SNE graph, scatter plot, horizontal bar chart, vertical bar chart, line graph, pie chart, heatmap, area chart, and/or the like.

In some embodiments, process 1450 may make user interface 1534 accessible to one or more users. The user interface 1534, in some embodiments, may enable a respective user to execute the bias mitigation process 1514 illustrated in FIG. 15A. The bias mitigation process 1514, as generally used herein, may refer to a process that reconfigures one or more components of machine learning-based decisioning model 1502 to mitigate the bias of the machine learning-based decisioning model 1502 (e.g., as indicated by the one or more bias intensity metrics 1534A-1534F). It shall be noted that, in some embodiments, method 1400 may execute the bias mitigation process 1514 in response to receiving a user input or a user-initiated trigger. Alternatively, in some embodiments, a user may execute the bias mitigation process 1514 in an external system (e.g., a system that may not be implementing method 1400).

In some embodiments, the machine learning-based decisioning model 1502 described in process 1410 may include one or more sub-models. For instance, in a non-limiting example, the one or more sub-models of the machine learning-based decisioning model may include at least one heuristic-based model comprising a plurality of decisioning heuristics (e.g., a model that generates a favorable or unfavorable decision based on the plurality of decisioning heuristics). A decisioning heuristic, as generally used herein, may comprise one or more rule criteria that, if satisfied, cause the heuristic-based model to generate a favorable decision. Conversely, if the rule criteria is not satisfied, the heuristic-based model may generate an unfavorable decision.

Accordingly, in some embodiments, reconfiguring the one or more components of the machine learning-based decisioning model 1502 to mitigate the bias may include reconfiguring thresholds of the plurality of decisioning heuristics to mitigate the heuristic-based model from generating unfavorable decisions for decisioning records that have similar attributes to the unfavorable decisioning record (e.g., unfavorable decisioning record 1508A). For instance, as described previously, a respective bias intensity metric of the one or more bias intensity metrics 1534A-1534E may indicate an unfairness of the machine learning-based decisioning model 1502. Thus, in some embodiments, the bias mitigation process may expand a range of a rule criterion to include the value associated with a corresponding attribute in unfavorable decisioning record 1508 (e.g., thereby mitigating or preventing the model 1502 from generating unfavorable decisions for future records that have a similar attribute value).

Additionally, or alternatively, in some embodiments, the one or more sub-models of the machine learning-based decisioning model 1502 may include a machine learning model. Accordingly, in some embodiments, reconfiguring the one or more components of the machine learning-based decisioning model 1502 to mitigate the bias may include updating a weight and a bias of the machine learning model to mitigate the machine learning model from generating unfavorable decisions for decisioning records that have similar attributes to the unfavorable decisioning record (e.g., unfavorable decisioning record 1508A). For instance, as described previously, a respective bias intensity metric of the one or more bias intensity metrics 1534A-1534E may indicate an unfairness of the machine learning-based decisioning model 1502. Thus, in some embodiments, the bias mitigation process may re-train the weights and biases of the machine learning-based decisioning model to identify the value associated with a corresponding attribute in unfavorable decisioning record 1508 as "favorable" (e.g., thereby mitigating or preventing the model 1502 from generating unfavorable decisions for future records that have a similar attribute value).

Furthermore, in some embodiments, reconfiguring the one or more components of the machine learning-based decisioning model 1502 to mitigate the bias may include reconfiguring an algorithmic structure of the machine learning model to include model constraints that constrain the machine learning model from generating unfavorable decisions for decisioning records that have similar attributes to the unfavorable decisioning record (e.g., unfavorable decisioning record 1508A). For instance, as described previously, a respective bias intensity metric of the one or more bias intensity metrics 1534A-1534E may indicate an unfairness of the machine learning-based decisioning model 1502. Thus, in some embodiments, the bias mitigation process may add a constraint to the machine learning-based decisioning model 1502 that identifies the value associated with a corresponding attribute in unfavorable decisioning record 1508 as favorable (e.g., thereby mitigating or preventing the model 1502 from generating unfavorable decisions for future records that have a similar attribute value).

Moreover, in some embodiments, reconfiguring the one or more components of the machine learning-based decisioning model 1502 to mitigate the bias may include transforming a prediction by the machine learning model from an unfavorable prediction to a favorable prediction when a corresponding decisioning record has similar factors as the factors causing the bias. For instance, as described previously, a respective bias intensity metric of the one or more bias intensity metrics 1534A-1534E may indicate an unfairness of the machine learning-based decisioning model 1502. Thus, in some embodiments, the bias mitigation process 1514 may reconfigure the machine learning-based decisioning model to identify the value associated with a corresponding attribute in unfavorable decisioning record 1508 as "favorable" and, in turn, transform records associated with a similar attribute value from an "unfavorable" decision to a "favorable" decision (e.g., thereby mitigating or preventing the model 1502 from generating unfavorable decisions for future records that have such attribute value).

Figure 16:
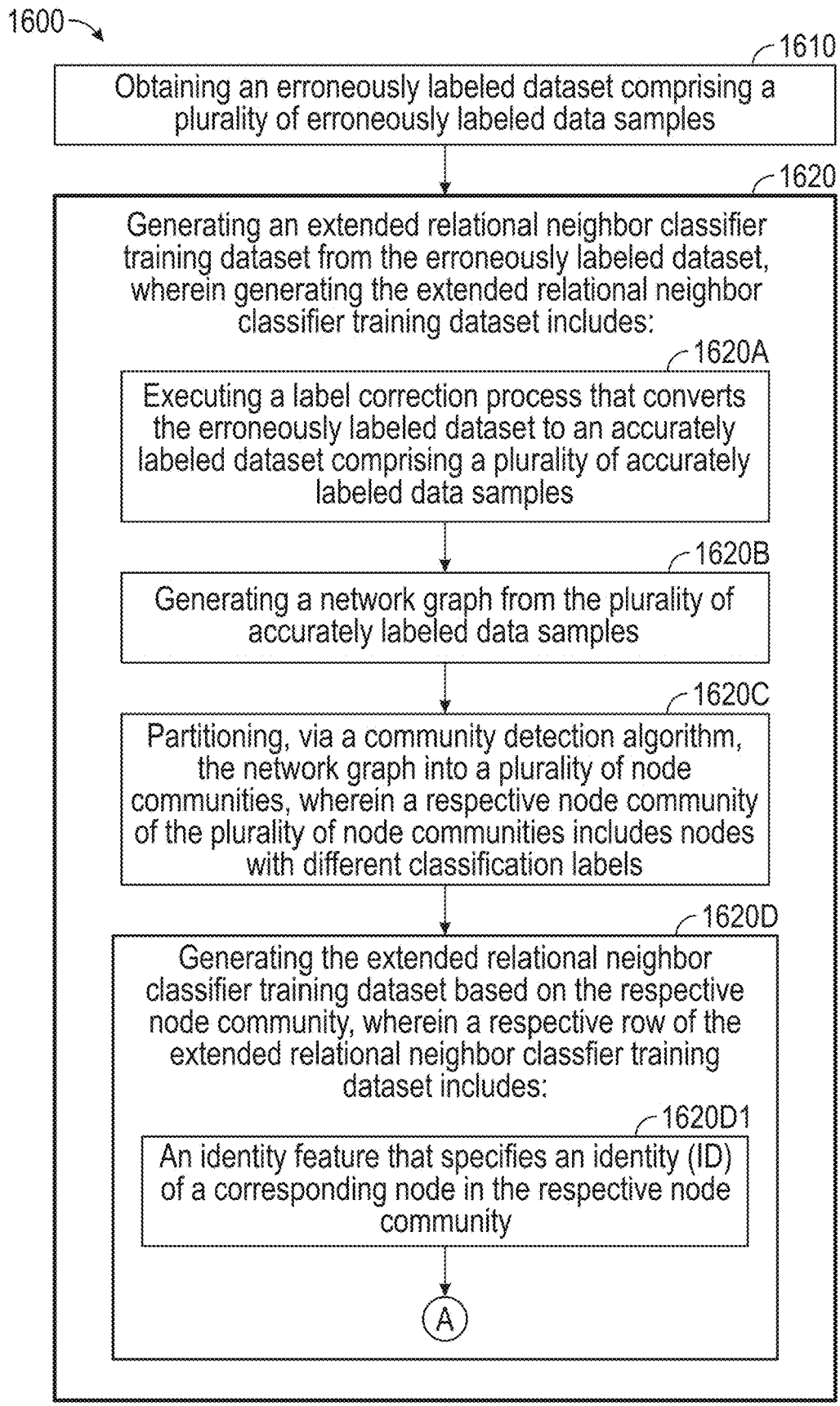
FIG. 16 illustrates a flow chart showing an example process for training a machine-learning model to assign labels to new data samples inserted into a dataset, according to some embodiments of the present technology.
Figure 16:
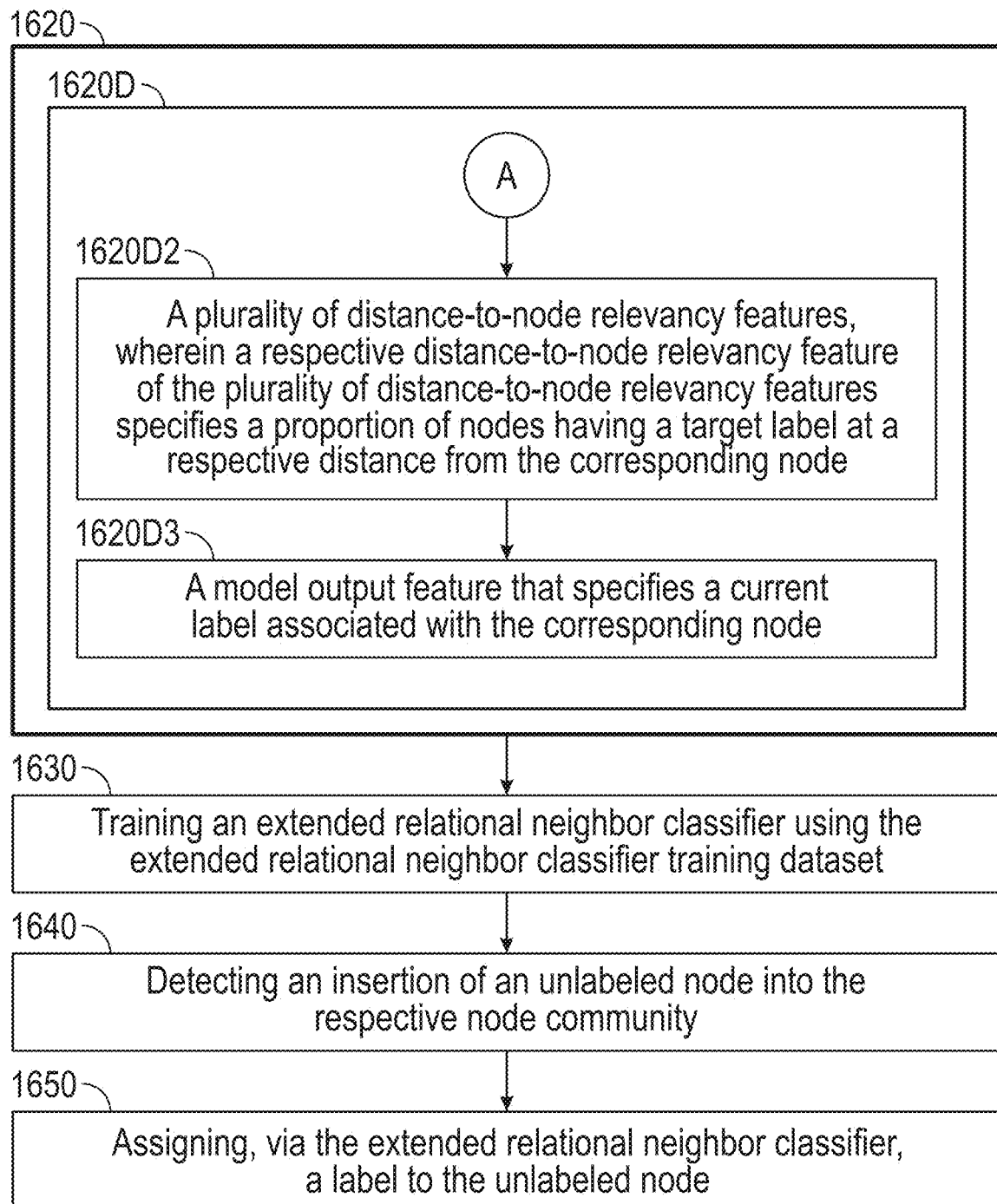

FIG. 16 illustrates one embodiment of method 1600 for correcting or rectifying erroneously labeled data samples corresponding to system records, using correctly labeled data samples in training an extended relational neighbor classifier (a machine-learning model, sometimes referred to as "ERNC"), and using the trained extended relational neighbor classifier to determine appropriate labels for new data samples added to the system records. System records may be represented as a dataset of data samples that have one or more attributes, including at least one label attribute. The label attributes of system records may be accessed by consumers of the system records for use in sensitive applications such as evaluation and decisioning processes, making the maintenance of accurate label attributes a key feature to maintaining the effectiveness of the system records for its consumers' applications and processes. Prior methods of label attribution to new or ingested data samples generally use existing relationships between data samples in system records, such as nearest-neighbor relationships between data samples, and probabilistically modelled relationships between data samples. However, these prior methods suffer from various shortcomings that may both limit the accuracy of such (prior) methodically-assigned labels, and prohibit performance of said prior label-assignment methods on limited or scarce computing resources. Method 1600 may detail a process that produces labels for new or ingested data samples that is a more accurate process (e.g., having a stronger correspondence to ground truth, or empirical basis) and more computationally compact process (e.g., being performable with fewer computing resources), relative to prior methods for the same task of label-assignment for data samples ingested into a dataset of system records.

A data sample label of a particular data sample in a dataset of system records may be one of many attributes of the particular data sample indicating a classification or determination about the particular data sample. Data sample labels may generally be based on any combination of: an identity attribute of the data sample, a distance attribute of the data sample, an initial or base label attribute of the data sample, or any other attribute of the data sample (sometimes referred generally as a "predictive feature" attribute for the label attribute). The distance attribute of the data sample may be an emergent or extrinsic attribute of the data sample; namely, the distance attribute may not correspond to any ground truth (or, "empirical basis") associated with the data sample itself (or, the data sample in isolation), but may instead represent an attribute that can be determined based on a location of the data sample in a graph or network representation of the entire system records dataset of data samples.

Method 1600 may additionally provide for correctly-labeled data samples used in the training of an extended relational neighbor classifier to be represented in a network graph format that connects data sample nodes based on their relatedness or relevancy to one another, where relatedness or relevancy of nodes may be represented by edge connections between related nodes. In some embodiments, data samples that share a label or other attribute may be represented as nodes connected to one another by edge connections in a network graph representation of the data samples. One underlying assumption of the extended relational neighbor classifier that assigns labels to new data sample nodes (whose training is described by method 1600) on the aforementioned bases of sample/node attributes may be the "homophily" of the data samples of the system records dataset. Although not illustrated as a separate process or sub-process of method 1600, a system performing method 1600 may check for homophily of the data samples of the system records dataset prior to performance of the method. Said system performing method 1600 may forego the performance of the method upon detecting that the data samples of the system records dataset are not a homophilic network. Homophily may be a classification applied to networks with a lower proportion of cross-labeled edges in the network (i.e., edges between nodes with a common label-of-interest in a graph representation of system records dataset) than an expected proportion of cross-labeled edges in a random network where the number of cross-labeled edges is based solely on proportions of the data samples with different values for a particular label-of-interest in the system records dataset (i.e., an expected proportion of cross-labeled edges ignoring edge connections based on common attributes other than said label-of-interest). Put more simply, a network graph of accurately labeled data samples may be considered homophilic when nodes with similar attributes are connected to each other more frequently than with nodes that do not have similar attributes. By virtue of both the homophilic nature of the network graph of accurately labeled data samples, and the supervised-learning training methodology of the extended relational neighbor classifier model, method 1600 may provide an explainable and reproducible procedure for determining a label for newly added or ingested data sample(s) to system records, based on the node's relatedness (sometimes referred to as "relevancy" or "distance" attribute) to neighboring nodes, as well as distant nodes in a graph representation of the system records (e.g., nodes separated from the inserted node by a distance of more than one edge connection).

In some embodiments, method 1600 may include process 1610 that functions to obtain an erroneously labeled dataset comprising a plurality of erroneously labeled data samples. Erroneously labeled data samples, in the context of system records that are corrected and then used for training by method 1600, may refer to decisioning records as described above in connection with decisioning dataset 1504 of FIG. 15A. Each attribute of a particular decisioning record may be referred to as a "label" of the particular decisioning record, the particular decisioning record may be referred to as a "data sample" of decisioning dataset 1504, and decisioning dataset 1504 may be referred to as "system records." In some embodiments, erroneously labeled data samples may refer to an entirely different dataset from the decisioning dataset 1504 described in connection with the counterfactual assessment and explainability artifact of FIGS. 14-15D, and may alternatively refer to: academic admission records, business records, financial records, government records, industrial records, environmental records such as agricultural or sensor data samples, customer records, behavioral records, location records, media content records, product records, or any other records corresponding to datasets maintained for academic, business, government, industrial, or physical entities. System record datasets may be maintained with error-free labels in some embodiments, and in said embodiments process 1610 may correspond simply to the obtainment of (correctly) labeled data samples, as can be appreciated by ordinarily skilled artisans. In the following examples, however, the data samples obtained by process 1610 may be assumed to contain at least one erroneous label requiring correction by a label correction process.

Method 1600 may proceed to process 1620 that functions to generate an extended relational neighbor classifier (ERNC) training dataset from the erroneously labeled data samples corresponding to a dataset of system records obtained by process 1610. A first sub-process 1620A of process 1620 for generating the ENRC training dataset may function to execute a label correction process that converts the erroneously labeled dataset to an accurately labeled dataset comprising a plurality of accurately labeled data samples. As stated above, the dataset of system records obtained by sub-process 1620A may be considered erroneously labeled when it includes one or more data samples with an erroneous label. In certain embodiments, an erroneous label may refer to a factual error in a data sample label, specifically referring to an actual or current label of the data sample record differing from a "ground truth" or actual attribute (and associated ground truth label) of the data sample. As an example, in an academic admissions context, a particular data sample of a dataset (e.g., a particular student of an application pool) may have a label that indicates the particular data sample is associated with an act of academic dishonesty, when in fact the particular data sample of the dataset has no association with any acts of academic dishonesty. In other embodiments, an erroneous label may refer to a syntactical or format-compliance error in a data sample label, specifically referring to an actual or current label of the data sample record having a missing label, or an incorrect or incompatible format of label for the purposes of an application or a process utilizing the system records dataset for decisioning or evaluation. In keeping with the exemplary context of academic admissions, a particular data sample of a dataset may have a label indicating academic achievement that is formatted as a weighted GPA (e.g., a number between 0 and 5), and applications for evaluating academic achievement of the dataset (e.g., an admissions pool) expect said label indicating academic achievement to be formatted as an unweighted GPA (e.g., a number between 0 and 4). In some embodiments, incorrectly labeled data samples of a dataset may be generated by a machine learning-based decisioning model that is trained using insufficient, inaccurate, or otherwise unsuitable data sets for labeling data samples of the dataset, and for labeling new data samples added to the dataset. To correct erroneous labels of data samples in the dataset, label correction process 1706 (discussed in greater detail below, in connection with FIG. 17A) may be applied to a subset of the dataset comprising data samples identified to have erroneous labels. In some embodiments, label correction process 1706 may be a machine learning-based model that is trained to identify erroneous labels (e.g., identifying erroneous outputs of another machine learning-based model responsible for erroneously labeling a data set), and further trained to correct the erroneous labels (e.g., determining a new label that corresponds to a ground truth associated with the data sample, or to a label format expected by consumers of the labeled dataset). In other embodiments, label correction process 1706 may be a user-assisted re-labeling process that assigns corrected labels to data samples on the basis of user input to label correction process 1706. Generally, label correction process 1706 may refer to any combination of user-assisted and autonomous operations to identify and correct erroneous labels associated with data samples of a dataset.

Following the execution of label correction process 1706 by sub-process 1620A, method 1600 may proceed to sub-process 1620B. Sub-process 1620B may function to generate a network graph from the plurality of accurately labeled data samples produced as output of label correction process 1706 (or equivalently, process 1610). A network graph may represent the relationships and connections between the data samples, facilitating the identification of patterns such as relationships between nodes separated by various distances, and the identification of communities within the dataset. As mentioned above in connection underlying assumptions of homophily in the dataset of system records, data samples that share a label or other attribute may be represented as nodes connected to one another by edge connections in a network graph representation of the data samples. FIG. 17B further illustrates an exemplary network graph of data samples with corrected labels-of-interest.

After sub-process 1620B generates the network graph, method 1600 may proceed to sub-process 1620C. Sub-process 1620C may function to partition the network graph into a plurality of node communities using a community detection algorithm. Nodes of a particular respective node community of the plurality of node community partitions determined by the community detection algorithm may include nodes with different classification labels (i.e., the community detection algorithm does not generate community partitions solely based on classification labels). FIG. 17C further illustrates exemplary community detection algorithm 1714 partitioning network graph 1710 into a first community 1714A and a second community 1714B.

After sub-process 1620C partitions the network graph into a plurality of communities, method 1600 may proceed to sub-process 1620D. Sub-process 1620D may generate the extended relational neighbor classifier training dataset based on the respective node community. A respective row of the extended relational neighbor classifier training dataset may include elements 1620D1, 1620D2, and 1620D3. Element 1620D1 may correspond to an identity feature (sometimes referred to as an "attribute") that specifies an identity (ID) of a corresponding node in the respective node community. This identity feature may be a unique or a non-unique identifier of each data sample within the training dataset, and may additionally contain information about some unlabeled attribute of the data sample (e.g., the ID of a product data sample may include information about the product type of a product data sample). Element 1620D2, shown on a second page of FIG. 16 may correspond to a plurality of distance-to-node relevancy features. Each distance-to-node relevancy feature specifies a proportion of nodes having a target label at a respective distance from the corresponding node. Features of element 1620D2 may quantitatively indicate a degree of relevance of nodes located at various distances from a particular node within the community, providing a weighting of the particular node's position relative to distant nodes with shared or similar labels-of-interest. In some embodiments, there may be a number of distance-to-node relevancy features for each data sample node of a dataset. Element 1620D2 may correspond to only those distance-to-node relevancy features that are within a predetermined maximum distance from any given node. As an example, if there are certain nodes with distance-to-node relevancy features corresponding to nodes separated by distances greater than 10 edge connections, but a predetermined maximum distance for element 1620D2 from any given node is 5 edge connections, distance-to-node relevancy features corresponding to nodes separated by more than 5 edge connections may be omitted from element 1620D2 (and may thereby be omitted from the training dataset for the extended relational neighbor classifier). Element 1620D3 may correspond to a model output feature that specifies a corrected and current label associated with the corresponding data sample or node. Element 1620D3 may represent training features corresponding to an output of the extended relational neighbor classifier, which the extended relational neighbor classifier may be trained to produce for new or ingested data samples on the basis of their identity features (corresponding to element 1620D1 of the training dataset for the extended relational neighbor classifier generated by process 1620D) and distance-to-node relevancy features (corresponding to element 1620D2 of the training dataset). FIG. 17D further illustrates an exemplary training set 1716 generated by process 1620D for the extended relational neighbor classifier.

Following the extended relational neighbor classifier training dataset being fully generated by process 1620, method 1600 may proceed to process 1630, which functions to train an extended relational neighbor classifier using the training dataset generated by process 1620. Process 1630 may therefore correspond to a supervised machine learning-based process by which a machine learning model is trained to generate outputs for new or ingested data samples with either missing or inaccurate labels. Due to being trained on data samples with corrected labels (i.e., element 1620D3) and distance-to-node relevancy features (i.e., element 1620D2), an extended relational neighbor classifier may be considered (and demonstrable as) a more accurate model for assigning labels to newly ingested data samples to the dataset used to train the extended relational neighbor classifier. Additionally, by capping the distance-to-node relevancy features considered during training of the extended relational neighbor classifier to only those distance-to-node relevancy features that are within a predetermined maximum distance from any given node, the extended relational neighbor classifier may be considered an improved (specifically, more computationally compact) method for using computing resources to perform the task of label determination for new data samples to any dataset. FIG. 17E further illustrates the training of extended relational neighbor classifier 1724 by machine learning model training and testing platform 1722. FIG. 17F further illustrates the efficacy 1724A of extended relational neighbor classifier 1724 trained using a decision tree machine learning-based model. FIG. 17G further illustrates an efficacy comparison 1724B of the extended relational neighbor classifier 1724 trained using a decision tree to various other machine learning-based models.

After the extended relational neighbor classifier is trained by process 1630, method 1600 may proceed to process 1640 that may function to detect the insertion of an unlabeled node (i.e., data sample) into the dataset, and specifically detecting the insertion of the unlabeled node into a respective node community in a network graph representation of the dataset. As an example, upon addition of a new data sample to a dataset, a new network graph for the dataset including the new data sample may be generated (i.e., sub-process 1620B may be re-performed) and a community for the new data sample may be determined on the basis of the new network graph (i.e., sub-process 1620C may be re-performed). FIG. 17H further illustrates the addition of a new data sample represented by node 1712Y, as well as parameters 1726 corresponding to the ID and distance-to-node relevancy features below the predetermined maximum distance from any given node for the new data sample being provided to extended relational neighbor classifier 1724.

Method 1600 concludes with process 1650 that functions to assign a label to the previously-unlabeled node corresponding to the new data sample added to the dataset, by providing parameters 1726 corresponding to the ID and distance-to-node relevancy features for the new data sample to extended relational neighbor classifier 1724. Due to being trained on the training dataset comprising data sample ID, and data sample distance-to-node relevancy features as training input, and corrected label as training output, extended relational neighbor classifier 1724 may generate a label using a more computationally compact process than conventional methods that do not limit the distance-to-node relevancy features for neighboring nodes to those below a predetermined maximum distance, where the generated label is more accurate than conventional methods as well. As can be appreciated by ordinarily skilled artisans, other examples contemplated within the scope of the present disclosure may involve more operations, fewer operations, different operations, or a different order of operations than as shown in FIG. 16.

Figure 17A:
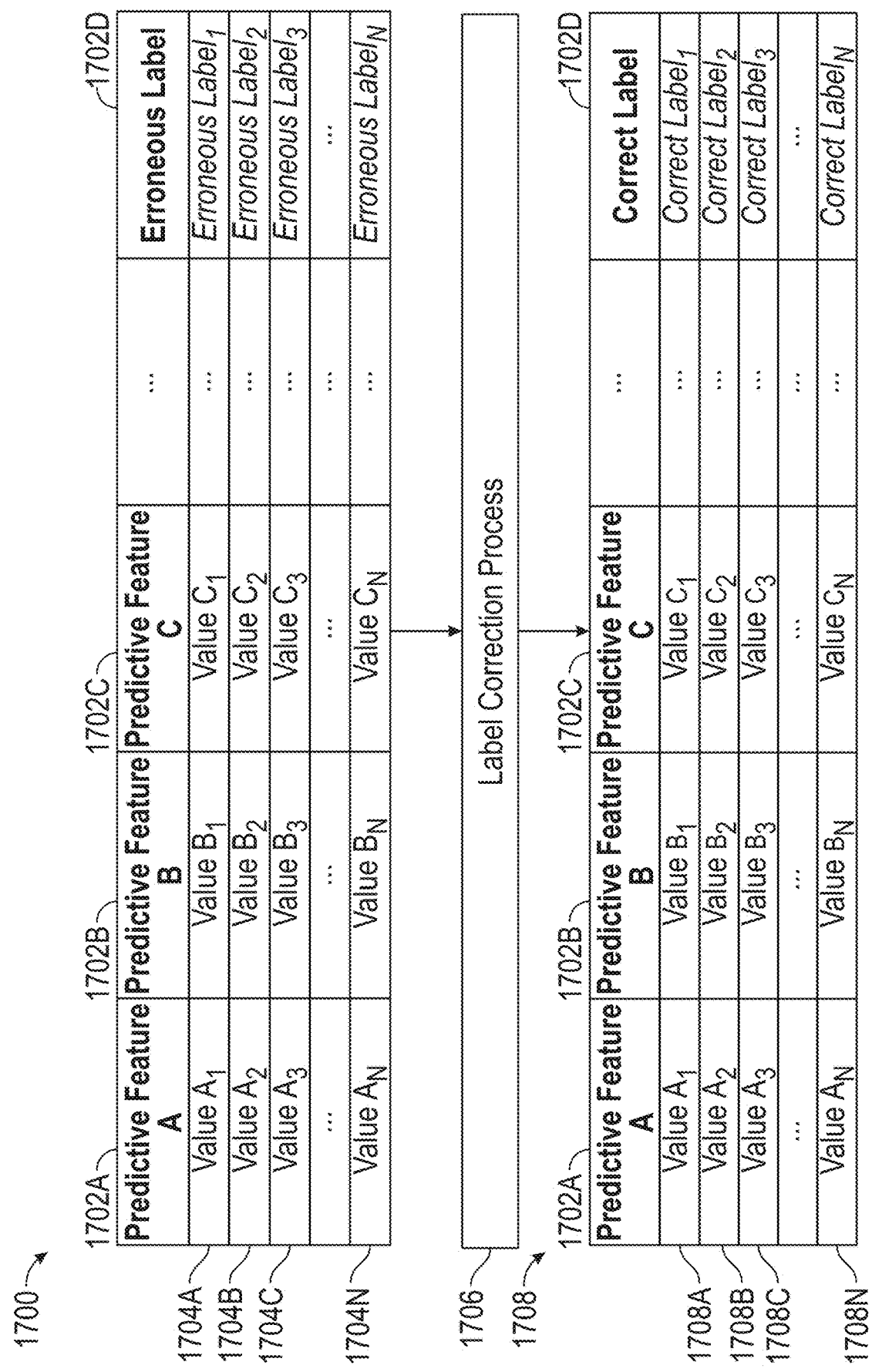
FIG. 17A illustrates a block diagram of a label correction process applied to incorrect labels in a dataset, according to some embodiments of the present technology.
Figure 17B:
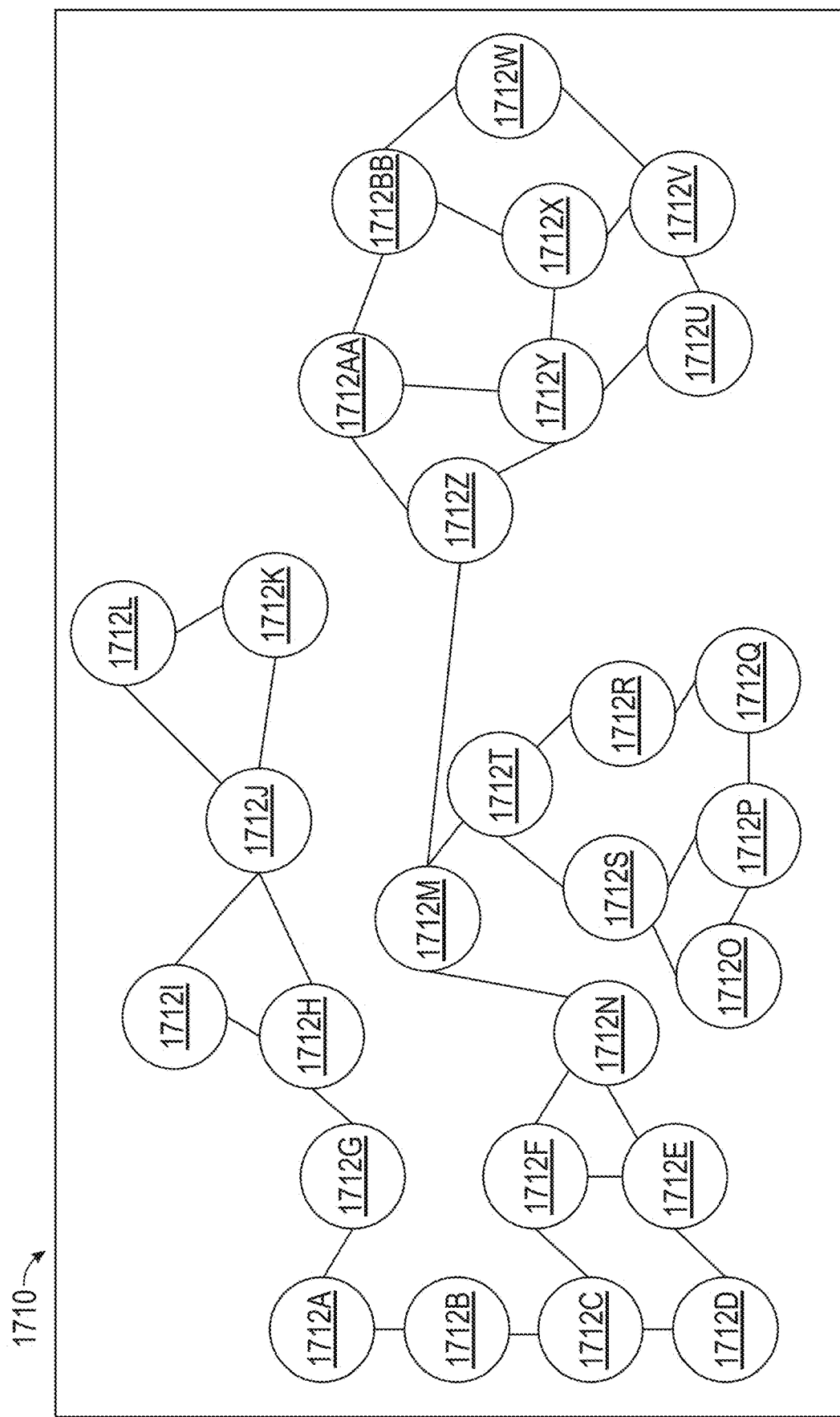
FIG. 17B illustrates an exemplary network graph representation of data samples in a dataset, according to some embodiments of the present technology.
Figure 17C:
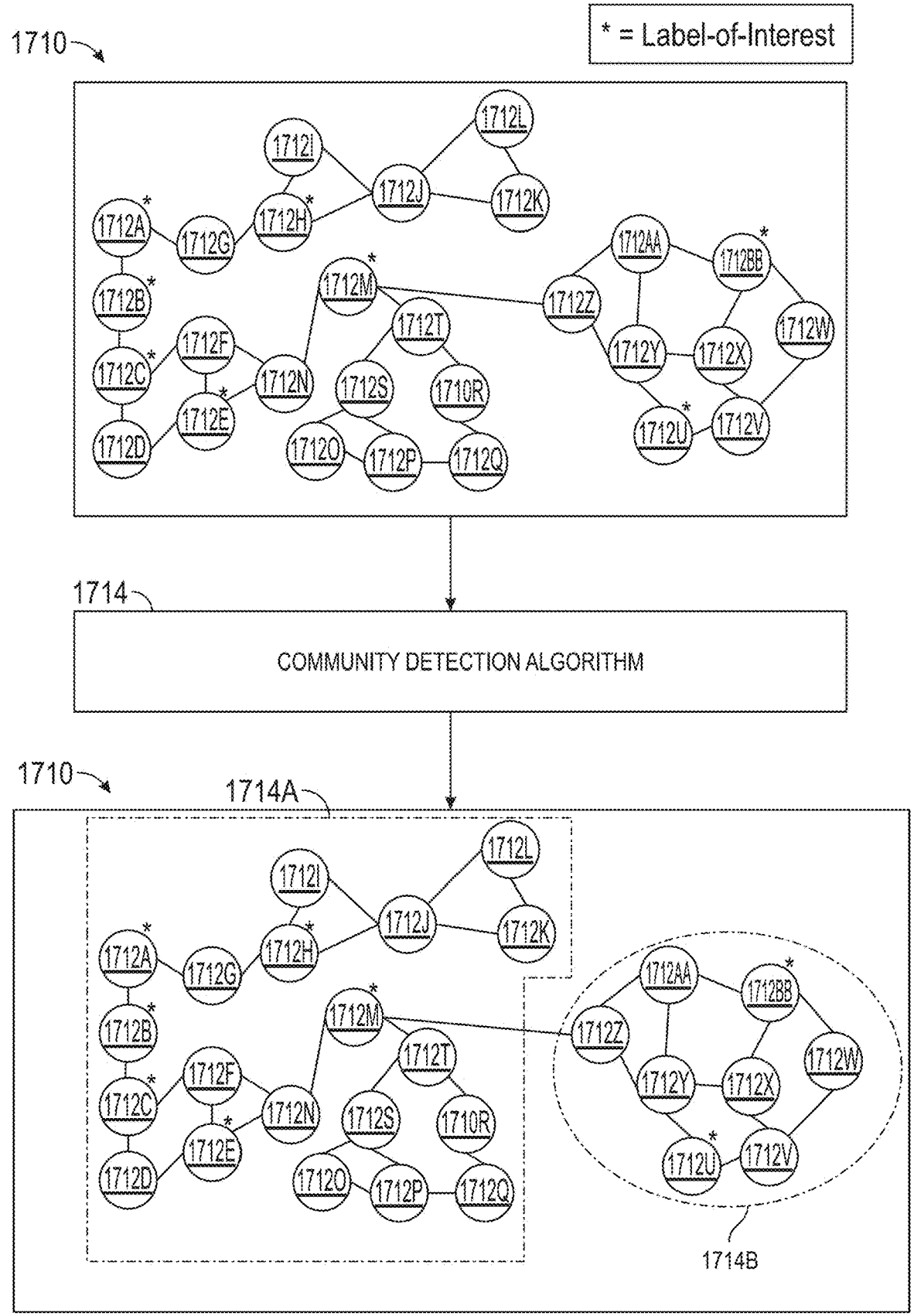
FIG. 17C illustrates a block diagram of a community detection algorithm applied to a dataset, according to some embodiments of the present technology.
Figure 17E:
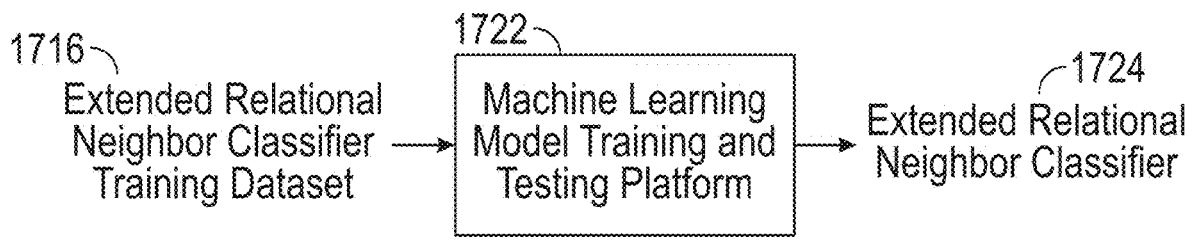
FIG. 17E illustrates a block diagram of a machine learning model training and testing platform training an extended relational neighbor classifier (ERNC) machine learning model, according to some embodiments of the present technology.
Figure 17F:
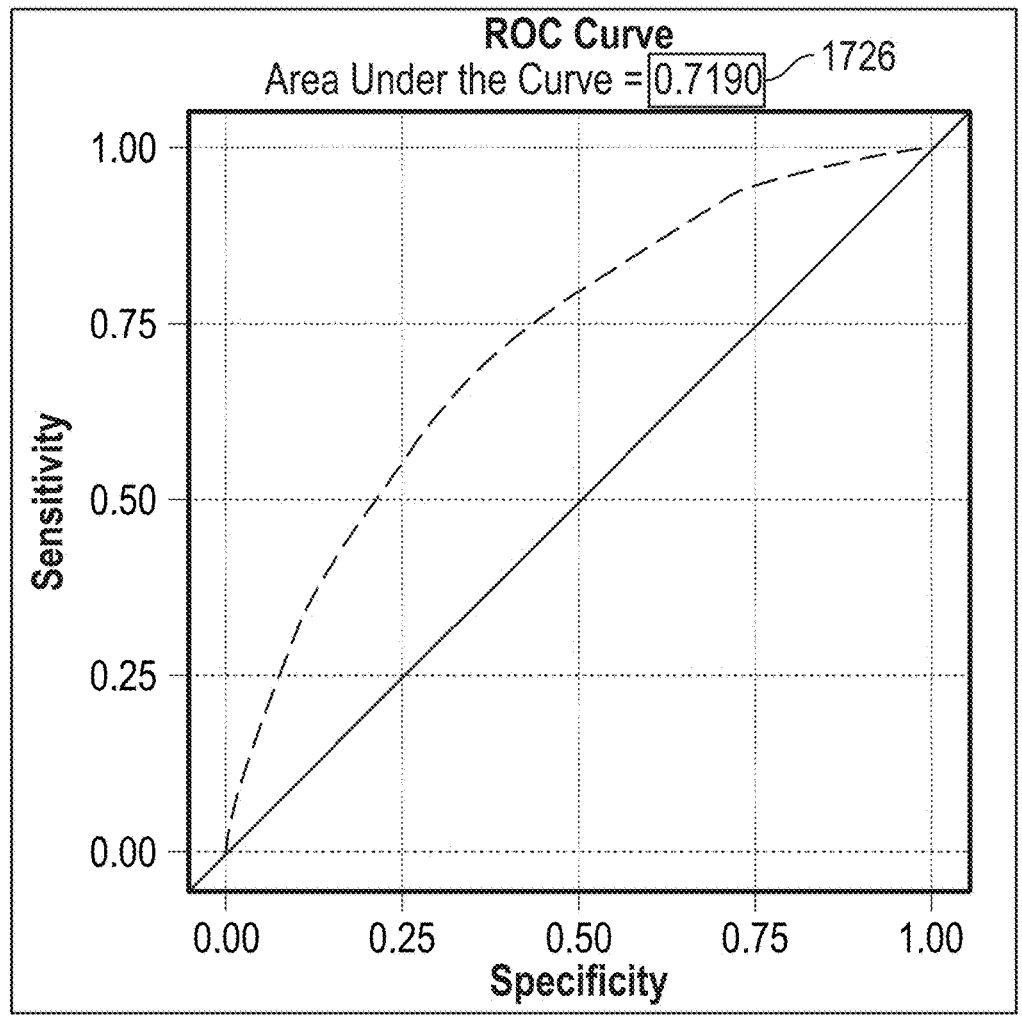
FIG. 17F illustrates an exemplary receiver operating characteristic (ROC) curve for an ERNC implemented as a decision tree-based classifier, according to some embodiments of the present technology.
Figure 17H:
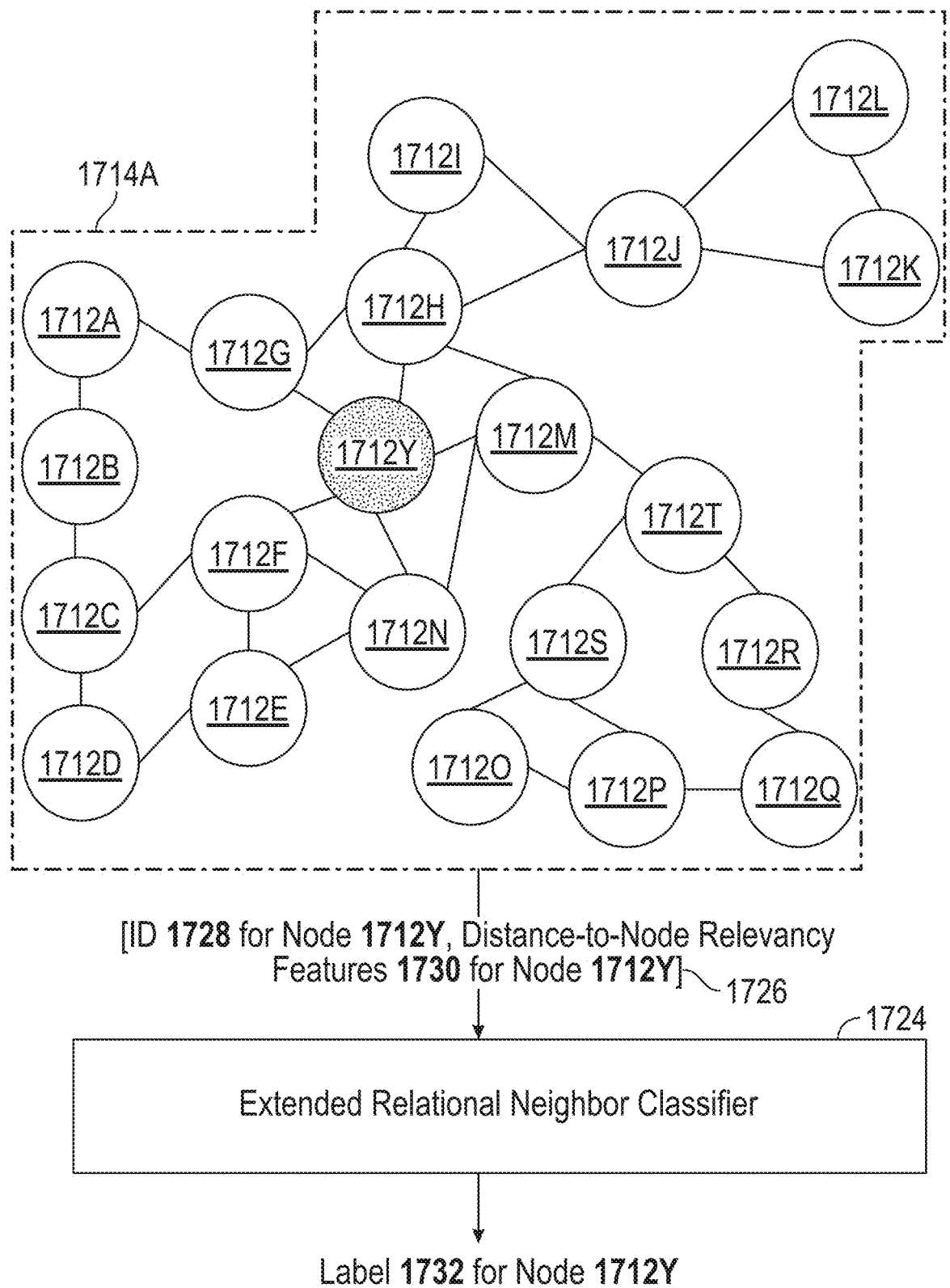
FIG. 17H illustrates an exemplary trained machine learning model assigning a label to a new data sample added to a respective community of a dataset, according to some embodiments of the present technology.

FIG. 17A shows an example of a label correction process 1706 applied to an erroneously-labeled dataset 1700, to produce correctly-labeled dataset 1708. Erroneously-labeled dataset 1700 may include multiple data samples (represented as rows in the tabular illustration of 1700), each containing several predictive features and an erroneous label. Specifically, the data sample predictive features may include predictive feature A 1702A, predictive feature B 1702B, and predictive feature C 1702C (represented as columns in the tabular illustration of 1700). Each predictive feature has corresponding values for each data sample. For instance, the first erroneously labeled data sample 1704A may include values A1, B1, and C1 for predictive features A, B, and C, respectively. Similarly, the second erroneously labeled data sample 1704B may include values A2, B2, and C2, and so on, up to the Nth erroneously labeled data sample 1704N, which includes values AN, BN, and CN. Predictive features A, B, and C may correspond to attributes of the data samples that are used as the basis for the edge connections of nodes when the dataset containing all data samples is represented as a network graph (e.g., in performing sub-process 1620B). As an example, if values for predictive feature A 1702A for data samples 1704A and 1704B are the same (e.g., if value A1 is the same as A2), then nodes representing the two data samples 1704A and 1704B may be connected by at least one edge connection (indicative of the nodes' shared value for predictive feature A). Each data sample in the erroneously labeled dataset 1700 may be associated with an erroneous label (represented as column 1702D). For example, the first erroneously labeled data sample 1704A has an erroneous label 1, the second erroneously labeled data sample 1704B has an erroneous label 2, and so forth until the n-th erroneously labeled data sample 1704N that has an erroneous label N.

Label correction process 1706 may be applied to the erroneously-labeled dataset 1700 to convert said dataset 1700 into the correctly-labeled dataset 1708. This process may involve correcting the erroneous labels 1702D to produce corrected labels 1702E. The label correction process 1706 ensures that each data sample is accurately labeled based on the ground truth and formatting expectations for labels-of-interest (especially those labels that the extended relational neighbor classifier may be used to assign to new data samples added to the dataset). As mentioned above, erroneous labels such as those in column 1702D may be the result of a machine learning-based label assignment process that was trained on that is trained using insufficient, inaccurate, or otherwise unsuitable data sets for labeling data samples of the dataset, and for labeling new data samples added to the dataset. Label correction process 1706 may refer to any combination of user-assisted and autonomous operations to identify and correct erroneous labels associated with data samples of a dataset, including (but not limited to) active label correction methods that use autonomous computational processes to identify erroneous labels, as well as consensus label correction methods where multiple models are used to independently label the same data sample and a final label is chosen based on the most frequent label selection by the multiple models (or other suitable metric for selecting between label determinations by the various multiple models).

Correctly-labeled dataset 1708 may mirror the structure of the erroneously labeled dataset 1700, but with corrected labels in column 1702D. Predictive feature A 1702A, predictive feature B 1702B, and predictive feature C 1702C may remain unchanged for each data sample represented by rows 1708A-N produced by label correction process 1706 (corresponding to the same data samples represented by rows 1704A-N in in erroneously-labeled dataset 1708). For instance, the first correctly labeled data sample 1708A may include values A1, B1, and C1 for predictive features A, B, and C, respectively, and a corrected label 1. Similarly, the second correctly labeled data sample 1708B includes values A2, B2, and C2, and a corrected label 2, and so on, up to the Nth correctly labeled data sample 1708N, which includes values AN, BN, and CN, and a corrected label N. Correctly-labeled dataset 1708 may be better capable of serving as a training set for extended relational neighbor classifier 1724 (of FIG. 17E) relative to erroneously-labeled dataset 1700, due to corrected labels of column 1702D of correctly-labeled dataset 1708 being based on ground truth or expected formatting for the data sample attributes that said corrected labels indicate. Although a single column 1702D (and therefore single label) is shown being corrected by label correction process 1706, any number of erroneous-label-containing columns may be identified and corrected by the label correction process, as may be appreciable by ordinarily skilled artisans.

FIG. 17B illustrates an exemplary network graph 1710, which is generated from a plurality of accurately- or correctly-labeled data samples. FIG. 17B may specifically illustrate an exemplary output of sub-process 1620B of FIG. 16. The network graph 1710 comprises may multiple nodes, each representing a data sample, and edges connecting these nodes, indicating relationships or similarities between the data samples (e.g., data samples with at least one common/shared attribute or predictive feature value). Network graph 1710 may include node 1712A, node 1712B, node 1712C, node 1712D, node 1712E, node 1712F, node 1712G, node 1712H, node 1712I, node 1712J, node 1712K, node 1712L, node 1712M, node 1712N, node 1712O, node 1712P, node 1712Q, node 1712R, node 1712S, node 1712T, node 1712U, node 1712V, node 1712W, node 1712W, node 1712X, node 1712Y, node 1712Z, node 1712AA, and node 1712BB with edge connections between nodes indicating nodes with a common value for an attribute or predictive feature associated their underlying data samples. As an example, two edge connections from node 1712A (to nodes 1712B and 1712G) may indicate that that the data sample represented by node 1712A has a common value for an attribute or predictive feature associated with the data sample represented by node 1712B, and a different common value for an attribute or predictive feature associated with the data sample represented by node 1712G. As an example, the data samples represented by node 1712A and node 1712B may have the same first value for a first predictive feature A, whereas the data samples represented by node 1712A and node 1712G may have the same second value for a second predictive feature B. Nodes 1712B and 1712G may themselves be unconnected to one another, indicating the absence of any common/shared values for any attribute or predictive feature associated with the data samples for nodes 1712B and 1712G. Generally, network graph 1710 may indicate an absence of any common attribute between two nodes by omitting or not including any edge connections between the two nodes. Network graph 1710 may be used to generate a training dataset for an extended relational neighbor classifier training dataset (per sub-process 1620A of FIG. 16). Each node in the graph may correspond to a row in the training dataset (or, a single data sample), with features of each node including the node's identity (ID of the data sample corresponding to element 1620D1), distance-to-node relevancy values (emergent attribute of the data sample in network graph context corresponding to element 1620D2), and label (a label-of-interest that the extended relational neighbor classifier is trained to generate for new nodes in network graph 1710 corresponding to new data samples added to the dataset and element 1620D3).

FIG. 17C shows an exemplary community detection algorithm applied to a network graph. FIG. 17C may illustrate an exemplary partition of a network graph 1710 corresponding to data samples of a dataset into two communities, as detailed above in connection with sub-process 1620C of FIG. 16. Community detection algorithm 1714 may represent any suitable combination of user-assisted and autonomous processes for partitioning a network graph into neighborhoods or clusters. In some embodiments, community detection algorithm 1714 may be free of any user-assisted processes, and may be an entirely autonomous process performed by the same computing resources that perform method 1600 of FIG. 16. Community detection algorithm 1714 may partition network graph 1710 into communities based on any suitable metrics or approaches, including but not limited to the approaches of conductance metric calculations, k-core decompositions, k-1 colorings, k-means clustering, label propagation, Leiden algorithm, local clustering coefficients, Louvain algorithm, modularity metrics, triangle counts, Girvan-Newman algorithm, leading eigenvector algorithm, infomap algorithm, walktrap algorithm, spinglass algorithm, fast greedy algorithm, and spectral clustering. Approaches implemented by community detection algorithm 1714 listed above may generally be modularity-based techniques that compare the grouping of nodes within a community to grouping of nodes outside the community, divisive methods that help isolate densely connected communities, or iterative methods that provisionally assign community labels to nodes and then update said labels iteratively until a stable state is reached. In certain embodiments, a first individual node may be partitioned into a first community of network graph 1710 when community detection algorithm 1714 detects that the network graph has a greater number of edge connections between the first individual node and nodes of the first community than edge connections between the respective nodes of other communities (e.g., different communities from the first community). In certain embodiments, a second individual node may be partitioned into a second community of network graph 1710 when community detection algorithm 1714 detects that the network graph has a greater number of edge connections between the second individual node and nodes of the second community than edge connections between the respective nodes of other communities (e.g., the first community or different communities from the first and second communities).

Community detection algorithm 1714 may generate a partitioned network graph 1710 with partitions for a first community 1714A and a second community 1714B, as shown in the lower part of FIG. 17C, after generating community partitions in the network graph as described above. First community 1714A may comprise node 1712A, node 1712B, node 1712C, node 1712D, node 1712E, node 1712F, node 1712G, node 1712H, node 1712I, node 1712J, node 1712K, node 1712L, node 1712M, node 1712N, node 1712O, node 1712P, node 1712Q, node 1712R, node 1712S, and node 1712T; second community 1714B may comprise node 1712U, node 1712V, node 1712W, node 1712W, node 1712X, node 1712Y, node 1712Z, node 1712AA, and node 1712BB. Nodes having a label-of-interest may be indicated by an asterisk symbol ("*"), and nodes of a particular respective node community of the plurality of node community partitions determined by the community detection algorithm may include nodes with different classification labels (i.e., the community detection algorithm does not generate community partitions solely based on labels-of-interest).

FIG. 17D shows an example of an extended relational neighbor classifier (ERNC) training dataset for a particular node community. Shown in tabular format, each row of ERNC training dataset 1716 may correspond to a data sample or node of network graph 1710. In certain embodiments, ERNC training dataset 1716 may only include rows corresponding to nodes within the same community (e.g., belonging to the same community partition determined by sub-process 1620C). Although not illustrated in FIG. 17D, an additional ERNC training dataset 1716 may be generated for each community partition determined by sub-process 1620C. ERNC training dataset 1716 of FIG. 17D may relate to the operations of sub-process 1620D in FIG. 16, and may include several features, namely the identity (ID) feature 1718A (corresponding to element 1620D1 of FIG. 16), distance-to-node relevancy features A 1718B, features B 1718C, features C 1718D, and features D 1718E (corresponding to element 1620D2 of FIG. 16) and the model output feature 730. For illustrative purposes, it may be assumed that each row of ERNC training dataset 1716 corresponds to training data based on data samples (or, nodes of network graph 1710) of the first community 1714A, and may include an ID feature 1718A (sometimes referred to as an "attribute") that specifies an identity (ID) of a corresponding node in the first community. For illustrative purposes, unique alphanumeric IDs are provided for each data sample row 1720A, 1720B, 1720C, and 1720N. However, ordinarily skilled artisans may appreciate that the IDs provided for each data sample row may be chosen differently, including using non-unique IDs (common IDs for more than one data sample row).

A plurality of distance-to-node relevancy features may be provided for each data sample row 1720A, 1720B, 1720C, and 1720N. Each distance-to-node relevancy feature may specify a proportion of nodes having a target label (sometimes referred to as a "label-of-interest") at a respective distance from the corresponding node. Each of the different distance-to-node relevancy features may correspond to a different distance-to-node relevancy metric; as an illustrative example, distance-to-node relevancy features A 1718B may correspond to the metric for nodes separated by an edge connection distance of one (i.e., immediate neighbors), features B 1718C may correspond to the metric for nodes separated by an edge connection distance of two, features C 1718D may correspond to the metric for nodes separated by an edge connection distance of 3, and features D 1718E may correspond to the metric for nodes separated by an edge connection distance that is one less than a predetermined maximum distance from any given node set during performance of method 1600. In some embodiments, the predetermined maximum distance from any given node may be expressed as a threshold percentage of all node-to-node distances within the respective node community. As an example, if a threshold percentage is set at 90 percent, and 90 percent of all node-to-node distances are within 8 edge connections, then distance-to-node relevancy features D 1702E may correspond to the distance-to-node relevancy metric for nodes separated by an edge connection distance of 8, and additional distance-to-node relevancy features corresponding to the metric for nodes separated by an edge connection distance greater than 8 may be omitted from inclusion in ERNC training dataset 1716. In this way, although additional distance-to-node relevancy features may be available for the nodes within a particular community of the graph network, the extended relational neighbor classifier may be considered an improved (specifically, more computationally compact) method for utilizing computing resources to perform the task of label assignment for new data samples or network graph nodes, when the number of distance-to-node relevancy features is capped by a predetermined maximum distance from a node (sometimes expressed as a threshold percentage of all node-to-node distances within a particular community).

Model output features 1702F that specify a corrected and current label associated with the corresponding data sample or graph network node within a particular community may be provided for each row of ERNC training dataset 1716. Features 1702F represent training features corresponding to an output of the extended relational neighbor classifier for a particular community of network graph 1710. The identity (ID) feature 1718A, and distance-to-node relevancy features A 1718B, features B 1718C, features C 1718D, and features D 1718E may represent training features corresponding to inputs of the extended relational neighbor classifier for a particular community of network graph 1710. In some embodiments, an ERNC training dataset 1716 may be generated for each node community detected by sub-process 1620C of FIG. 16 or community detection algorithm 1714.

FIG. 17E shows an exemplary machine learning model training and testing platform. FIG. 17E specifically shows the integration of the ERNC training dataset 1716 with the machine learning model training and testing platform 1722, which subsequently generates and configures extended relational neighbor classifier 1724. ERNC training dataset 1716 may provide a set of attributes, features, identifiers, and labels for data samples in a particular community that have undergone label correction. ERNC training dataset 1716 may be provided to machine learning model training and testing platform 1722, which functions to train the machine learning models on the basis of the ERNC training dataset. Platform 1722 may receive the structured ERNC training dataset 1716 and use identity (ID) feature 1718A, and distance-to-node relevancy features A 1718B, features B 1718C, features C 1718D, and features D 1718E as input training features, and model output features 1702F to optimize performance of ERNC 1724, ensuring that it can accurately determine and assign labels to new data samples added to the dataset without a label. In certain embodiments, ERNC 1724 may be a tree-based classifier such as a decision tree classifier, a random forest classifier, or a gradient boosting machine classifier. In other embodiments ERNC 1724 may be a logistic regression classifier. In some embodiments, where by virtue of sub-process 1620C of FIG. 16 or community detection algorithm 1714 of FIG. 17C detecting multiple node communities in the network graph representation of a dataset, multiple different ERNC training dataset 1716 may be generated. In such embodiments, the features described below in connection with FIG. 17E may be duplicated for each respective ERNC training dataset 1716 corresponding to a respective node community, such that multiple ERNCs 1724 trained on respective different ERNC training datasets 1716 may be generated, with each of the multiple ERNCs 1724 corresponding to a respective node community detected by community detection algorithm 1714.

FIG. 17F shows an example of a receiver operating characteristic (ROC) curve for ERNC 1724, when ERNC 1724 is implemented as a tree-based classifier (e.g., a decision tree). The ROC curve 1724 may be a graphical representation that illustrates the performance of ERNC 1724 as its discrimination threshold is varied. The x-axis represents Specificity (False Positive Rate), while the y-axis represents Sensitivity (True Positive Rate). The curve plots the trade-off between sensitivity and specificity, providing a view of the classifier's performance across different threshold settings. The Area Under the Curve (AUC) 1726 value of 0.7190 is a metric derived from the ROC curve of ERNC 1724 and the straight diagonal line indicating the performance of a random classifier. In this way, ROC curve 1724 may quantify the overall ability of the classifier to distinguish between labels or the underlying classifications corresponding to said labels. An AUC value closer to 1 may indicate a high-performing model, while a value closer to 0.5 may suggest a model with no discriminative power over a random classifier.

FIG. 17G shows an exemplary comparison of different modeling techniques implemented at machine learning model training and testing platform 1722, using the area under the ROC curve values for each of the modeling techniques for ERNC 1724. The first row in the table 1724 represents the performance of a traditional relational neighbor classifier (RNC) that only accounts for immediate/nearest neighbors when determining a label for a new data sample added to a community of nodes in a graph network 1710, and has an AUC value of 0.6156. The second row represents the traditional RNC with all levels that accounts for all neighbors (e.g., with no predetermined maximum distance parameter limiting distance-to-node relevancy features below a threshold percentage of all node-to-node distances), and has an AUC value of 0.6252. The third row represents the extended relational neighbor classifier (ERNC) without community that may omit the community partitioning sub-processes described in connection with sub-process 1620C of FIG. 16 and community detection algorithm 1714 of FIG. 17C, and has an AUC value of 0.6301. The fourth row in the table 1724 represents the ERNC with community partitions and has an AUC value of 0.6312. The fifth row represents the ERNC with community and a logistic regression model, and has an AUC value of 0.7084. Finally, the sixth row represents the ERNC with community and decision tree (corresponding to the ROC curve 1724 and AUC 1726 of FIG. 17F, and has an AUC value of 0.719.

FIG. 17H is an exemplary illustration of ERNC 1724 assigning a label to an inserted node corresponding to a new data sample added to first community 1714A of network graph 1710. First community 1714A may include nodes 1712A-1712T, and a newly added node 1712Y. Node 1712Y is specifically highlighted as the node for which a label is to be assigned, and may be distinct/different from node 1712Y in second community 1714B illustrated in earlier drawings. Upon detection of node 1712Y being inserted into first community 1714A (corresponding to process 1640 of FIG. 16), parameters 1726 corresponding to node 1712Y may be provided to ERNC 1724. Parameters 1726 may include inputs corresponding to input training features that ERNC 1724 has been trained on, such as an ID 1728 for the node (corresponding to ID feature 1718A of FIG. 17D and element 1620D1 of FIG. 16), and distance-to-node relevancy features 1730 for the node (corresponding to features 1718B-1718E of FIG. 17D and element 1620D2 of FIG. 16). ERNC 1724 may assign a label to node 1712Y on the basis of parameters 1726. In some embodiments, nodes of first community 1714A may include nodes with a first classification label (such as the "label-of-interest" indicated in FIG. 17C) and a second classification label (such as no label, or a different label from the "label-of-interest" indicated in FIG. 17C). ERNC 1724 may assign either the first label or the second label to the unlabeled node 1712Y, based on its response to receiving parameters 1726 upon insertion of the unlabeled node to the first community 1714A.

It shall be noted that the system and methods described herein can be embodied and/or implemented at least in part as a machine configured to receive a computer-readable medium storing computer-readable instructions. The instructions are preferably executed by computer-executable components preferably integrated with the system and one or more portions of the processors and/or the controllers.

The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
    obtaining an erroneously labeled dataset comprising a plurality of erroneously labeled data samples;
    generating an extended relational neighbor classifier training dataset from the erroneously labeled dataset, wherein generating the extended relational neighbor classifier training dataset includes:
        executing a label correction process that converts the erroneously labeled dataset to an accurately labeled dataset comprising a plurality of accurately labeled data samples;
        generating a network graph from the plurality of accurately labeled data samples;
        partitioning, via a community detection algorithm, the network graph into a plurality of node communities, wherein a respective node community of the plurality of node communities includes nodes with different classification labels; and
        generating the extended relational neighbor classifier training dataset based on the respective node community, wherein each data sample of the extended relational neighbor classifier training dataset is represented by a respective row spanning over a set of columns of features, and wherein each row of the extended relational neighbor classifier training dataset includes:
            an identity feature at a first column of the set of columns that specifies an identity (ID) of a corresponding node in the respective node community,
            a plurality of distance-to-node relevancy features, each of the plurality of distance-to-node relevancy features at a respective column of the set of columns distinct from the first column and a second column of the set of columns, wherein a respective distance-to-node relevancy feature of the plurality of distance-to-node relevancy features specifies a number of nodes having a target label at a respective distance from the corresponding node relative to a total number of nodes at the respective distance from the corresponding node, wherein the respective distance for any given distance-to-node relevancy feature of the plurality of distance-to-node relevancy features is distinct from respective distances of other distance-to-node relevancy features of the plurality, and a model output feature at the second column of the set of columns that specifies a current label associated with the corresponding node; and training a decisioning model comprising an extended relational neighbor classifier using the extended relational neighbor classifier training dataset, wherein the training comprises:

receiving, at a machine learning model training and testing platform, training data comprising data samples of the extended relational neighbor classifier training dataset;

associating, at the machine learning model training and testing platform and for each of the data samples, one or more input features of a respective data sample to one or more output features of the respective data sample, wherein the one or more input features comprise the plurality of distance-to-node relevancy features included at the respective row and the one or more output features comprise the model output feature included at the respective row; and generating, at the machine learning model training and testing platform, a decision tree model or one or more neural networks for the extended relational neighbor classifier based at least in part on the associating, wherein:

the one or more neural networks includes a plurality of layers of neurons that exchange data via one or more connections, and the plurality of layers of neurons include:

an input layer of neurons that is associated with a first set of weights and that receives the one or more input features comprising the plurality of distance-to-node relevancy features, one or more hidden layers of neurons that are associated with a second set of weights and that are between the input layer of neurons and an output layer of neurons, and the output layer of neurons is associated with a third set of weights and provides a result to the input data, including the model output feature;

detecting an insertion of an unlabeled node into the respective node community;

assigning, via the extended relational neighbor classifier, a label to the unlabeled node;

determining, via an explainability artifact, that the decisioning model that assigned the label is biased; and enabling an updating of the decision tree model or the one or more neural networks including:

updating the first set of weights associated with the input layer of neurons, the second set of weights associated with the one or more hidden layers of neurons, and the third set of weights associated with the output layer of neurons using backpropagation, and using the backpropagation to update the first set of weights associated with the input layer of neurons, the second set of weights associated with the one or more hidden layers of neurons, and the third set of weights associated with the output layer of neurons includes:

determining a gradient of the first set of weights, the second set of weights, and the third set of weights based on a difference between the result to the input data and a desired output, and updating the first set of weights associated with the input layer of neurons, the second set of weights associated with the one or more hidden layers of neurons, and the third set of weights associated with the output layer of neurons based on the gradient.

2. The computer-program product according to claim 1, wherein:

the entry corresponding to the respective data sample includes a respective bias intensity metric, the entry includes the visual emphasis when a value of the respective bias intensity metric is less than a threshold amount, and the plurality of erroneously labeled data samples correspond to incorrect predictions made by a machine learning-based decisioning model.

3. The computer-program product according to claim 1, wherein:

the entry corresponding to the respective data sample includes a respective bias intensity metric that represents a difference between a respective attribute in the respective data sample and a second respective data sample, the visual emphasis is displayed at the respective bias intensity metric to further indicate that the respective attribute associated with the respective bias intensity metric is a factor contributing to a bias in the decisioning model, and the plurality of distance-to-node relevancy features includes:

the respective distance-to-node relevancy feature, and one or more additional distance-to-node relevancy features that specifies a number of nodes having the target label at one or more other distances from the corresponding node.

4. The computer-program product according to claim 1, wherein:

the entry corresponding to the respective data sample includes a respective bias intensity metric that is displayed with the visual emphasis and a second respective bias intensity metric that is not displayed with the visual emphasis, displaying the respective bias intensity metric with the visual emphasis further indicates that a first attribute associated with the respective bias intensity metric is a first factor contributing to a bias in the decisioning model, displaying the second respective bias intensity metric without the visual emphasis indicates that a second attribute associated with the second respective bias intensity metric is not a second factor contributing to the bias in the decisioning model, a distance between the corresponding node and the nodes with different classification labels is less than a pre-defined maximum distance, the respective node community further includes nodes exceeding the pre-defined maximum distance from the corresponding node, including a plurality of nodes located at a second respective distance from the corresponding node, and the plurality of distance-to-node relevancy features:
    includes the respective distance-to-node relevancy feature, and
    does not include a second respective distance-to-node relevancy feature that specifies a number of the plurality of nodes having the target label at the second respective distance from the corresponding node.

5. The computer-program product according to claim 4, wherein:
    the computer instructions, when executed by the one or more processors, perform operations comprising:
        receiving a user-initiated trigger, and
        in response to receiving the user-initiated trigger, executing a bias mitigation process that prevents a bias in the decisioning model by reconfiguring one or more components of the decisioning model, and
    the pre-defined maximum distance is a distance that includes at least a threshold percentage of all node-to-node distances within the respective node community.

6. The computer-program product according to claim 5, wherein:
    the decisioning model comprises one or more sub-models, including the extended relational neighbor classifier and at least one heuristic-based model comprising a plurality of decisioning heuristics,
    reconfiguring the one or more components of the decisioning model to prevent the bias in the decisioning model at least includes reconfiguring thresholds of the plurality of decisioning heuristics to mitigate the heuristic-based model from generating unfavorable decisions for respective data samples having similar attributes to the respective data sample,
    the plurality of node communities at least include the respective node community and one or more additional node communities, and
    the community detection algorithm partitions a respective node of the network graph into:
        the respective node community when the community detection algorithm detects that the network graph has a greater number of edge connections between the respective node and nodes of the respective node community than edge connections between the respective node and nodes of the one or more additional node communities.

7. The computer-program product according to claim 6, wherein:
    the decisioning model comprises one or more sub-models, including the extended relational neighbor classifier and at least one machine learning model,
    reconfiguring the one or more components of the decisioning model to prevent the bias in the decisioning model at least includes using backpropagation to update one or more weights associated with one or more layers of neurons in the one machine learning model, wherein the backpropagation includes:
        determining a gradient of the one or more weights associated with one or more layers of neurons associated with the one machine learning model,
        updating the one or more weights associated with the one or more layers of neurons based on the gradient, and
        repeating the backpropagation at least a thousand of times, the one or more additional node communities include a first additional node community, and
the community detection algorithm further partitions the respective node of the network graph into:
    the first additional node community when the community detection algorithm detects that the network graph has a greater number of edge connections between the respective node and nodes of the first additional node community than the edge connections between the respective node and the nodes of the respective node community.

8. The computer-program product according to claim 5, wherein:
    the decisioning model comprises one or more sub-models, including the extended relational neighbor classifier and at least one machine learning model,
    reconfiguring the one or more components of the decisioning model to prevent the bias in the decisioning model at least includes:
        reconfiguring an algorithmic structure of the one machine learning model to include model constraints that constrain the one machine learning model from generating unfavorable decisions for respective data samples that having similar attributes to the respective data sample,
    the plurality of accurately labeled data samples include a first plurality of accurately labeled data samples that have a common attribute,
    the network graph includes a first plurality of nodes corresponding to the first plurality of accurately labeled data samples, and
    the first plurality of nodes are connected by one more edges to indicate the common attribute.

9. The computer-program product according to claim 8, wherein:
    the explainability artifact includes:
        a first table component that includes an entry corresponding to an unfavorable decisioning record, and
        a second table component that includes the entry corresponding to the respective data sample and one or more other entries corresponding to one or more other respective data samples, wherein the respective data sample and the one or more other respective data samples correspond to favorable decisioning records,
        a graph component that graphs the unfavorable decisioning record and the favorable decisioning records to illustrate a distribution of a respective attribute shared by the unfavorable decisioning record and the favorable decisioning records,
    the network graph includes the first plurality of nodes and at least one additional node,
    the additional node in the network graph corresponds to an additional accurately labeled data sample of the plurality of accurately labeled data samples,
    the first plurality of accurately labeled data samples have the common attribute and the additional accurately labeled data sample does not have the common attribute, and
    the network graph does not include edges connecting the additional node to the first plurality of nodes to indicate an absence of the common attribute in the additional accurately labeled data sample.

10. The computer-program product according to claim 1, wherein:
    the network graph is homophilic, and the network graph is homophilic when nodes with similar attributes are connected to each other more frequently than with nodes that do not have similar attributes.

11. The computer-program product according to claim 1, wherein:
the extended relational neighbor classifier is a tree-based extended relational neighbor classifier, and
assigning, via the extended relational neighbor classifier, the label to the unlabeled node includes:
computing, via the extended relational neighbor classifier, the label for the unlabeled node based on nodes in the respective node community directly connected to the unlabeled node and nodes in the respective node community indirectly connected to the unlabeled node.

12. The computer-program product according to claim 1, wherein:
an erroneously labeled data sample of the plurality of erroneously labeled data samples comprises one or more predictive features and an erroneous label assigned by a machine learning-based decisioning model, and
the plurality of accurately labeled data samples includes an accurately labeled data sample corresponding to the erroneously labeled data sample, wherein the accurately labeled data sample includes:
the one or more predictive features of the erroneously labeled data sample, and
a correct label that resolves the erroneous label in the erroneously labeled data sample.

13. The computer-program product according to claim 1, wherein:
the erroneously labeled dataset is a dataset that includes a data sample with an incorrect label,
the data sample has the incorrect label when a current label associated with the data sample differs from a ground truth label associated with the data sample, and
the data sample does not have the incorrect label when the current label associated with the data sample matches the ground truth label associated with the data sample.

14. The computer-program product according to claim 1, wherein the label correction process converts a respective erroneously labeled data sample to an accurately labeled data sample by:
receiving user input specifying a ground truth label for the respective erroneously labeled data sample, and
based on receiving the user input:
converting the respective erroneously labeled data sample to the accurately labeled data sample by replacing an erroneous label currently assigned to the respective erroneously labeled data sample with the ground truth label.

15. The computer-program product according to claim 1, wherein:
the nodes with different classification labels include one or more nodes with a first classification label and one or more nodes with a second classification label, and
the label that the extended relational neighbor classifier assigns to the unlabeled node is one of: the first classification label and the second classification label.

16. A computer-implemented method comprising:
obtaining an erroneously labeled dataset comprising a plurality of erroneously labeled data samples;
generating an extended relational neighbor classifier training dataset from the erroneously labeled dataset, wherein generating the extended relational neighbor classifier training dataset includes:
executing a label correction process that converts the erroneously labeled dataset to an accurately labeled dataset comprising a plurality of accurately labeled data samples;
generating a network graph from the plurality of accurately labeled data samples;
partitioning, via a community detection algorithm, the network graph into a plurality of node communities, wherein a respective node community of the plurality of node communities includes nodes with different classification labels; and
generating the extended relational neighbor classifier training dataset based on the respective node community, wherein each data sample of the extended relational neighbor classifier training dataset is represented by a respective row spanning over a set of columns of features, and wherein each row of the extended relational neighbor classifier training dataset includes:
an identity feature at a first column of the set of columns that specifies an identity (ID) of a corresponding node in the respective node community,
a plurality of distance-to-node relevancy features, each of the plurality of distance-to-node relevancy features at a respective column of the set of columns distinct from the first column and a second column of the set of columns, wherein a respective distance-to-node relevancy feature of the plurality of distance-to-node relevancy features specifies a number of nodes having a target label at a respective distance from the corresponding node relative to a total number of nodes at the respective distance from the corresponding node, wherein the respective distance for any given distance-to-node relevancy feature of the plurality of distance-to-node relevancy features is distinct from respective distances of other distance-to-node relevancy features of the plurality, and
a model output feature at the second column of the set of columns that specifies a current label associated with the corresponding node; and
training a decisioning model comprising an extended relational neighbor classifier using the extended relational neighbor classifier training dataset, wherein the training comprises:
receiving, at a machine learning model training and testing platform, training data comprising data samples of the extended relational neighbor classifier training dataset;
associating, at the machine learning model training and testing platform and for each of the data samples, one or more input features of a respective data sample to one or more output features of the respective data sample, wherein the one or more input features comprise the plurality of distance-to-node relevancy features included at the respective row and the one or more output features comprise the model output feature included at the respective row; and
generating, at the machine learning model training and testing platform, a decision tree model or one or more neural networks for the extended relational neighbor classifier based at least in part on the associating, wherein:
the one or more neural networks includes a plurality of layers of neurons that exchange data via one or more connections, and
the plurality of layers of neurons include:

an input layer of neurons that is associated with a first set of weights and that receives the one or more input features comprising the plurality of distance-to-node relevancy features, one or more hidden layers of neurons that are associated with a second set of weights and that are between the input layer of neurons and an output layer of neurons, and the output layer of neurons is associated with a third set of weights and provides a result to the input data, including the model output feature;

detecting an insertion of an unlabeled node into the respective node community, assigning, via the extended relational neighbor classifier, a label to the unlabeled node; and determining, via an explainability artifact, that the decisioning model that assigned the label is biased; and enabling an updating of the decision tree model or the one or more neural networks including:

updating the first set of weights associated with the input layer of neurons, the second set of weights associated with the one or more hidden layers of neurons, and the third set of weights associated with the output layer of neurons using backpropagation, and using the backpropagation to update the first set of weights associated with the input layer of neurons, the second set of weights associated with the one or more hidden layers of neurons, and the third set of weights associated with the output layer of neurons includes:

determining a gradient of the first set of weights, the second set of weights, and the third set of weights based on a difference between the result to the input data and a desired output, and updating the first set of weights associated with the input layer of neurons, the second set of weights associated with the one or more hidden layers of neurons, and the third set of weights associated with the output layer of neurons based on the gradient.

17. The computer-implemented method according to claim 16, wherein the plurality of erroneously labeled data samples correspond to incorrect predictions made by a machine learning-based decisioning model.

18. The computer-implemented method according to claim 16, wherein the plurality of distance-to-node relevancy features includes:

the respective distance-to-node relevancy feature, and one or more additional distance-to-node relevancy features that specifies a number of nodes having the target label at one or more other distances from the corresponding node.

19. The computer-implemented method according to claim 16, wherein:

a distance between the corresponding node and the nodes with different classification labels is less than a pre-defined maximum distance, the respective node community further includes nodes exceeding the pre-defined maximum distance from the corresponding node, including a plurality of nodes located at a second respective distance from the corresponding node, and the plurality of distance-to-node relevancy features:
includes the respective distance-to-node relevancy feature, and does not include a second respective distance-to-node relevancy feature that specifies a proportion of the plurality of nodes having the target label at the second respective distance from the corresponding node.

20. The computer-implemented method according to claim 19, wherein the pre-defined maximum distance is a distance that includes at least a threshold percentage of all node-to-node distances within the respective node community.

21. The computer-implemented method according to claim 16, wherein:

the plurality of node communities at least includes the respective node community and one or more additional node communities, and the community detection algorithm partitions a respective node of the network graph into:

the respective node community when the community detection algorithm detects that the network graph has a greater number of edge connections between the respective node and nodes of the respective node community than edge connections between the respective node and nodes of the one or more additional node communities.

22. The computer-implemented method according to claim 21, wherein:

the one or more additional node communities include a first additional node community, and the community detection algorithm further partitions the respective node of the network graph into:

the first additional node community when the community detection algorithm detects that the network graph has a greater number of edge connections between the respective node and nodes of the first additional node community than the edge connections between the respective node and the nodes of the respective node community.

23. The computer-implemented method according to claim 16, wherein:

the plurality of accurately labeled data samples include a first plurality of accurately labeled data samples that have a common attribute, the network graph includes a first plurality of nodes corresponding to the first plurality of accurately labeled data samples, and the first plurality of nodes are connected by one more edges to indicate the common attribute.

24. The computer-implemented method according to claim 23, wherein:

the network graph includes the first plurality of nodes and at least one additional node, the additional node in the network graph corresponds to an additional accurately labeled data sample of the plurality of accurately labeled data samples, the first plurality of accurately labeled data samples have the common attribute and the additional accurately labeled data sample does not have the common attribute, and the network graph does not include edges connecting the additional node to the first plurality of nodes to indicate an absence of the common attribute in the additional accurately labeled data sample.

25. A computer-implemented system comprising:
one or more processors;
a memory;
a computer-readable medium operably coupled to the one or more processors, the computer-readable medium having computer-readable instructions stored thereon that, when executed by the one or more processors, cause a computing device to perform operations comprising:

obtaining an erroneously labeled dataset comprising a plurality of erroneously labeled data samples;

generating an extended relational neighbor classifier training dataset from the erroneously labeled dataset, wherein generating the extended relational neighbor classifier training dataset includes:

executing a label correction process that converts the erroneously labeled dataset to an accurately labeled dataset comprising a plurality of accurately labeled data samples;

generating a network graph from the plurality of accurately labeled data samples;

partitioning, via a community detection algorithm, the network graph into a plurality of node communities, wherein a respective node community of the plurality of node communities includes nodes with different classification labels; and generating the extended relational neighbor classifier training dataset based on the respective node community, wherein each data sample of the extended relational neighbor classifier training dataset is represented by a respective row spanning over a set of columns of features, and wherein each row of the extended relational neighbor classifier training dataset includes:

an identity feature at a first column of the set of columns that specifies an identity (ID) of a corresponding node in the respective node community, a plurality of distance-to-node relevancy features, each of the plurality of distance-to-node relevancy features at a respective column of the set of columns distinct from the first column and a second column of the set of columns, wherein a respective distance-to-node relevancy feature of the plurality of distance-to-node relevancy features specifies a number of nodes having a target label at a respective distance from the corresponding node relative to a total number of nodes at the respective distance from the corresponding node, wherein the respective distance for any given distance-to-node relevancy feature of the plurality of distance-to-node relevancy features is distinct from respective distances of other distance-to-node relevancy features of the plurality, and a model output feature at the second column of the set of columns that specifies a current label associated with the corresponding node; and training a decisioning model comprising an extended relational neighbor classifier using the extended relational neighbor classifier training dataset, wherein the training comprises:

receiving, at a machine learning model training and testing platform, training data comprising data samples of the extended relational neighbor classifier training dataset;

associating, at the machine learning model training and testing platform and for each of the data samples, one or more input features of a respective data sample to one or more output features of the respective data sample, wherein the one or more input features comprise the plurality of distance-to-node relevancy features included at the respective row and the one or more output features comprise the model output feature included at the respective row; and generating, at the machine learning model training and testing platform, one or more neural networks for the extended relational neighbor classifier based at least in part on the associating, wherein:

the one or more neural networks includes a plurality of layers of neurons that exchange data via one or more connections, and the plurality of layers of neurons include:

an input layer of neurons that is associated with a first set of weights and that receives the one or more input features comprising the plurality of distance-to-node relevancy features, one or more hidden layers of neurons that are associated with a second set of weights and that are between the input layer of neurons and an output layer of neurons, and the output layer of neurons is associated with a third set of weights and provides a result to the input data, including the model output feature;

detecting an insertion of an unlabeled node into the respective node community;

assigning, via the extended relational neighbor classifier, a label to the unlabeled node;

determining, via an explainability artifact, that the decisioning model that assigned the label is biased; and enabling an updating of the decision tree model or the one or more neural networks including:

updating the first set of weights associated with the input layer of neurons, the second set of weights associated with the one or more hidden layers of neurons, and the third set of weights associated with the output layer of neurons using backpropagation, and using the backpropagation to update the first set of weights associated with the input layer of neurons, the second set of weights associated with the one or more hidden layers of neurons, and the third set of weights associated with the output layer of neurons includes:

determining a gradient of the first set of weights, the second set of weights, and the third set of weights based on a difference between the result to the input data and a desired output, and updating the first set of weights associated with the input layer of neurons, the second set of weights associated with the one or more hidden layers of neurons, and the third set of weights associated with the output layer of neurons based on the gradient.

26. The computer-implemented system according to claim 25, wherein:

the backpropagation is at least repeated a thousand times, the extended relational neighbor classifier is a tree-based extended relational neighbor classifier, and assigning, via the extended relational neighbor classifier, the label to the unlabeled node includes:

computing, via the extended relational neighbor classifier, the label for the unlabeled node based on nodes in the respective node community directly connected to the unlabeled node and nodes in the respective node community indirectly connected to the unlabeled node.

27. The computer-implemented system according to claim 25, wherein:

the plurality of layers of neurons are associated with one of: a feed-forward neural network and a recurrent neural network, when the plurality of layers of neurons are associated with the feed-forward neural network, the one or more connections of the one or more neural networks are configured so that each neuron in the plurality of layers of neurons propagates an output value to a subsequent layer of the plurality of layers of neurons, when the plurality of layers of neurons are associated with the recurrent neural network, the one or more connections include one or more feedback loops that cause the data to forward and background propagate through the plurality of layers of neurons, an erroneously labeled data sample of the plurality of erroneously labeled data samples comprises one or more predictive features and an erroneous label assigned by a machine learning-based decisioning model, and the plurality of accurately labeled data samples includes an accurately labeled data sample corresponding to the erroneously labeled data sample, wherein the accurately labeled data sample includes:
  the one or more predictive features of the erroneously labeled data sample, and
  a correct label that resolves the erroneous label in the erroneously labeled data sample.

28. The computer-implemented system according to claim 25, wherein:
the unlabeled node corresponds to the respective data sample,
the computer-readable instructions, when executed by the one or more processors, cause the computing device to perform operations comprising:
  displaying, via a graphical user interface, an explainability artifact that includes an entry corresponding to the respective data sample, wherein the entry includes visual emphasis indicating an unfairness of the decisioning model that assigned the label,
the erroneously labeled dataset is a dataset that includes a data sample with an incorrect label,
the data sample has the incorrect label when a current label associated with the data sample differs from a ground truth label associated with the data sample, and
the data sample does not have the incorrect label when the current label associated with the data sample matches the ground truth label associated with the data sample.

29. The computer-implemented system according to claim 25, wherein the label correction process converts a respective erroneously labeled data sample to an accurately labeled data sample by:
receiving user input specifying a ground truth label for the respective erroneously labeled data sample, and
based on receiving the user input:
  converting the respective erroneously labeled data sample to the accurately labeled data sample by replacing an erroneous label currently assigned to the respective erroneously labeled data sample with the ground truth label.

30. The computer-implemented method according to claim 25, wherein:
the nodes with different classification labels include one or more nodes with a first classification label and one or more nodes with a second classification label, and
the label that the extended relational neighbor classifier assigns to the unlabeled node is one of: the first classification label and the second classification label.

* * * * *